(12) United States Patent
Klappert

(10) Patent No.: US 8,131,132 B2
(45) Date of Patent: Mar. 6, 2012

(54) SYSTEMS AND METHODS FOR PROVIDING INTERACTIVE CONTENT DURING WRITING AND PRODUCTION OF A MEDIA ASSET

(75) Inventor: Walter Richard Klappert, Los Angeles, CA (US)

(73) Assignee: United Video Properties, Inc., Santa Clara, CA (US)

(*) Notice: Subject to any disclaimer, the term of this patent is extended or adjusted under 35 U.S.C. 154(b) by 321 days.

(21) Appl. No.: 12/631,107

(22) Filed: Dec. 4, 2009

(65) Prior Publication Data

US 2011/0135278 A1    Jun. 9, 2011

(51) Int. Cl.
*H04N 9/80* (2006.01)
*H04N 5/93* (2006.01)
*G11B 27/00* (2006.01)

(52) U.S. Cl. .......................... 386/248; 386/278

(58) Field of Classification Search ............... 386/248, 386/278, 280, 282, 299
See application file for complete search history.

(56) References Cited

U.S. PATENT DOCUMENTS

| 5,638,113 | A | 6/1997 | Lappington et al. |
| 6,404,978 | B1* | 6/2002 | Abe ........................... 386/281 |
| 2002/0120504 | A1 | 8/2002 | Gould et al. |
| 2003/0193518 | A1 | 10/2003 | Newnam et al. |
| 2007/0189709 | A1* | 8/2007 | Ageishi et al. ............... 386/52 |
| 2008/0066106 | A1* | 3/2008 | Ellis et al. ................... 725/40 |

* cited by examiner

*Primary Examiner* — Thai Tran
*Assistant Examiner* — Nigar Chowdhury
(74) *Attorney, Agent, or Firm* — Ropes & Gray LLP

(57) ABSTRACT

Systems and methods for providing interactive content during writing and production of a media asset are provided. A script of a media asset that includes natural language textual annotations that define uniquely interactive content and timing contingencies during which to display the interactive content may be received. After the media asset corresponding to the script is produced, computer language instructions may be generated based on the natural language annotations. The computer language instructions and the media asset may be stored on a master storage medium. The media asset and computer language instructions may be transmitted to a media equipment device. Playback time codes may be transmitted with the media asset. When a playback time code corresponds to an event that identifies interactive content, the media equipment device may display the interactive content represented by the computer language instructions during a time interval defined by the computer language instructions.

36 Claims, 12 Drawing Sheets

600 →

SCRIPT OF SCREENPLAY

• • •

610 — [SCENE 3: CENTRAL PERK, JOEY IS GETTING A PHONE NUMBER FROM A WOMAN (CASEY) AS CHANDLER WATCHES FROM THE DOORWAY.]

620 {

CASEY: HERE YOU GO.

JOEY: GREAT! ALL RIGHT, SO I'LL CALL YOU LATER.

CASEY: GREAT! (LEAVES)

CHANDLER: (RUSHING UP) HEY-HEY-HEY! WHO WAS THAT?

JOEY: THAT WOULD BE CASEY. WE'RE GOING OUT TONIGHT.

CHANDLER: GOIN' OUT, HUH? WOW! WOW! (DOES A LITTLE CELEBRATION DANCE) SO THINGS DIDN'T WORK OUT WITH KATHY, HUH? BUMMER.

JOEY: NO, THINGS ARE FINE WITH KATHY. I'M HAVING A LATE DINNER WITH HER TONIGHT, RIGHT AFTER MY EARLY DINNER WITH CASEY.

630 { 640 ⟶   ⟵ 650
TRIVIA (MC) - WHO WILL JOE END UP LIKING MORE? A. KATHY B. CASEY; C. NONE.
ANSWER BY SCENE 9. POINT VALUE IS 125.
⎵        ⎵
660         670

CHANDLER: (SHOCKED) WHAT?

JOEY: YEAH-YEAH. AND THE CRAZIEST THING IS THAT I JUST ATE A WHOLE PIZZA BY MYSELF! (LAUGHS)

CHANDLER: WAIT! YOU'RE GOING OUT WITH KATHY!

JOEY: YEAH. WHY ARE YOU GETTING SO UPSET?

INTERACTIVE TABLE OF CONTENTS (ITOC)

| TIME (710) | EVENT (720) |
|---|---|
| 00:00:00 | BEGINNING OF TEASER |
| 00:00:00 | {INTERACTIVE NOTICE} |
| 00:00:00 | {CHALLENGE 0: EVERGREEN} (730) |
| 04:00:00 (712) | {CHALLENGE 1: BEST BY 06:51:23, OK BY 30:20:06, TIME DECREASED SCORING} (760) |
| 04:00:00 | BEGINNING OF OPENING CREDITS (740) |
| 05:14:17 | ENDING OF OPENING CREDITS |
| 05:14:18 | {ALTERNATIVE COMMERCIAL BREAK A} |
| 06:51:22 | ENDING OF TEASER |
| 06:51:22 | {COMMERCIAL BREAK A} |
| 06:51:23 | BEGINNING OF ACT 1 |
| 09:40:16 | {CHALLENGE 2: BEST BY 13:29:14, OK BY 30:20:06, TIME DECREASED SCORING} (762) |
| 10:14:24 | {POSSIBLE COMMERCIAL BREAK A1} |
| 13:26:27 | {CHALLENGE 3: BEST BY 14:30:04, OK BY 23:19:25, TIME INCREASED SCORING} (764) |
| 13:29:13 | ENDING OF ACT 1 |
| 13:29:13 | {COMMERCIAL BREAK B} |
| 13:29:14 | BEGINNING OF ACT 2 |
| 15:52:17 | {CHALLENGE 4: MUST BY 18:18:24, TIME INDIFFERENT SCORING} (765) |
| 18:18:23 | {POSSIBLE COMMERCIAL BREAK B1} |
| 20:35:09 | {CHALLENGE 5: BEST BY 25:20:20, OK BY 30:20:06, TIME DECREASED SCORING} |
| 25:20:19 | ENDING OF ACT 2 |
| 25:20:19 | {COMMERCIAL BREAK C} |
| 25:20:20 | BEGINNING OF ACT 3 |
| 25:42:16 | {CHALLENGE 6: MUST BY 26:20:23, TIME INDIFFERENT SCORING} |
| 28:16:11 | {POSSIBLE COMMERCIAL BREAK C1} |
| 32:30:09 | {CHALLENGE 7: MUST BY 33:00:17, TIME INDIFFERENT SCORING} |
| 32:42:05 | ENDING OF ACT 3 |

750 braces the "OK BY 30:20:06, TIME DECREASED SCORING" portion.

FIG. 7

SYSTEMS AND METHODS FOR PROVIDING INTERACTIVE CONTENT DURING WRITING AND PRODUCTION OF A MEDIA ASSET

BACKGROUND OF THE INVENTION

Traditional interactive video application systems create interactive content for display with television programs after the television programs have been produced, filmed and edited. In particular, the traditional interactive video application systems allow computer programmers to generate, for example, trivia or games for provision to the user when the user watches the television programs. These systems do not allow for the creative talent of the writer of the scripts to be included in the generation of the interactive content when the writer writes the scripts. More specifically, no mechanism exists in the traditional interactive video application systems that employs the creative talent of the writer in generating interactive content.

SUMMARY OF THE INVENTION

In view of the foregoing, systems and methods for providing interactive content during writing and production of a media asset are provided. In particular, interactive content may be defined using natural language in a textual script of a screenplay corresponding to a media asset. The textual script may be used after the media asset is produced during, for example, the editing process to create computer language code for the interactive content defined in the textual script.

In some embodiments, a script of a screenplay of a media asset may be received. The script may include natural language annotations that define uniquely interactive content and timing contingencies during which to display the interactive content. In some implementations, the interactive content may include subject matter that is similar or related to subject matter of the media asset corresponding to the script. After the media asset corresponding to the script is produced, an editing system may edit the media asset and generate computer language instructions based on the script of the media asset.

In some embodiments, the editing system may receive the script of the media asset and the produced media asset. The editing system may parse the script to determine playback positions corresponding to action lines or events. In some implementations, the editing system may generate an interactive table of contents that includes time code indicators and event indicators. The time code indicators may indicate substantially exact points in time in the media asset at which events corresponding to event indicators occur. In particular, the time code indicator may identify an event indicator that identifies interactive content. The event indicator may include computer language instructions or a reference to computer language instructions that are to be executed at the corresponding time code. In some implementations, the event indicators may identify commercial breaks, starting points and ending points of acts in the media asset and dialog in the media asset.

In some embodiments, the editing system may generate the computer language instructions corresponding to an annotation in the script based on a predefined standard. In particular, the editing system may determine which function defined by the computer language instructions corresponds to the natural language textual annotation in the script. The editing system may use the function and parameters supplied by the annotation in the script to generate the computer language instructions. In some implementations, the editing system may determine based on the annotation and the interactive table of contents, an end point at which to terminate the execution of the computer language instructions. In some implementations, a human operator at the editing system may use the script to read the natural language annotations and write the corresponding computer language instructions. In some embodiments, the time interval defined by the timing contingencies in the natural language annotations correspond to a period of time during a commercial break in the media asset is provided.

In some embodiments, the final edited version of the media asset and the computer language instructions including the interactive table of contents may be stored on a master storage medium. The master storage medium may be used by a distribution source such as a cable, satellite, internet or other broadcast source to transmit the media asset and the computer language instructions or interactive content to end users at media equipment devices. In some implementations, the interactive table of contents may be transmitted to the end users at the media equipment devices multiple times during playback of the media asset. In some implementations, the media equipment devices may locally store the received interactive table of contents.

In some embodiments, the distribution source may transmit or provide to the media equipment devices playback time codes that represent a unique point in time of playback of the media asset. The media equipment device may receive the playback time codes and determine whether a received playback time code corresponds to a time code indicator in the interactive table of contents. When the received playback time code corresponds to a time code indicator that is associated with an event indicator that identifies interactive content, the media equipment device may retrieve the computer language instructions identified or included in the event indicator. In some implementations, the media equipment device may display the interactive content by executing the retrieved computer language instructions. The media equipment device may terminate execution of the computer language instructions and ignore any user responses that are received after a playback time code is received that corresponds to an end point of the computer language instruction execution in the interactive table of contents.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 is an illustrative script of a screenplay document in accordance with an embodiment of the invention;

FIG. 7 is an illustrative interactive table of contents in accordance with an embodiment of the invention;

DETAILED DESCRIPTION

Figure 1:
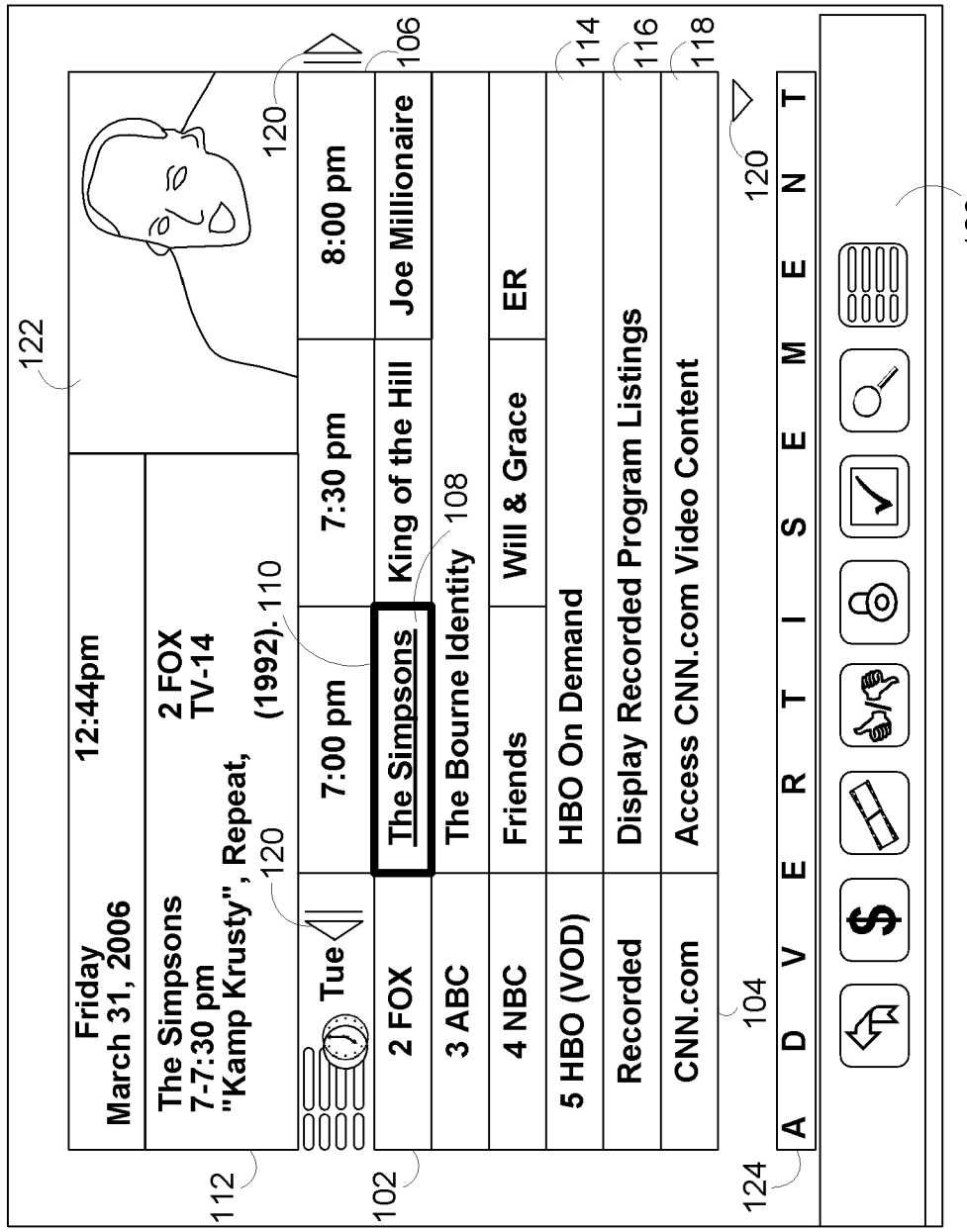
FIGS. 1 and 2 show illustrative display screens that may be used to provide media guidance application listings in accordance with an embodiment of the invention.

This invention generally relates to systems and methods for providing interactive content during writing and production of a media asset. In particular, interactive content may be defined using natural language in a textual script of a screenplay corresponding to a media asset. The textual script may be used after the media asset is produced during, for example, the editing process to create computer language code for the interactive content defined in the textual script.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 2:
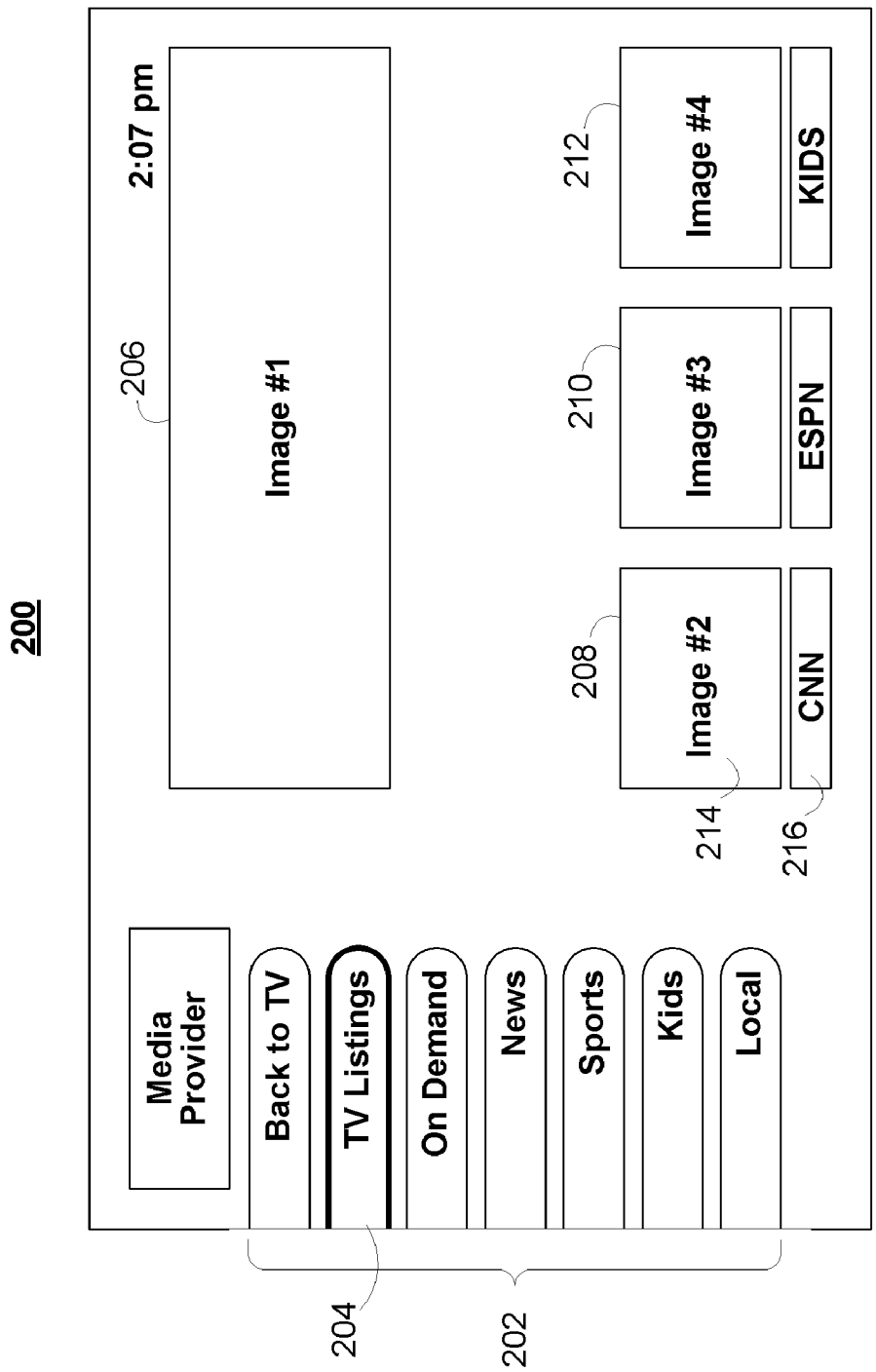

One of the functions of the media guidance application is to provide media listings and media information to users. FIGS. 1-2 show illustrative display screens that may be used to provide media guidance, and in particular media listings. The display screens shown in FIGS. 1-2 and 9-11 may be implemented on any suitable device or platform. While the displays of FIGS. 1-2 and 9-11 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site (e.g., HULU or YOUTUBE) or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to (i.e., be related to) or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,814, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, scheduling a reminder for a program, ordering a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179, 410, filed Jul. 11, 2005, Boyer et al., U.S. Pat. No. 7,165,098, issued Jan. 16, 2007, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, still frames of a video associated with the listing, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
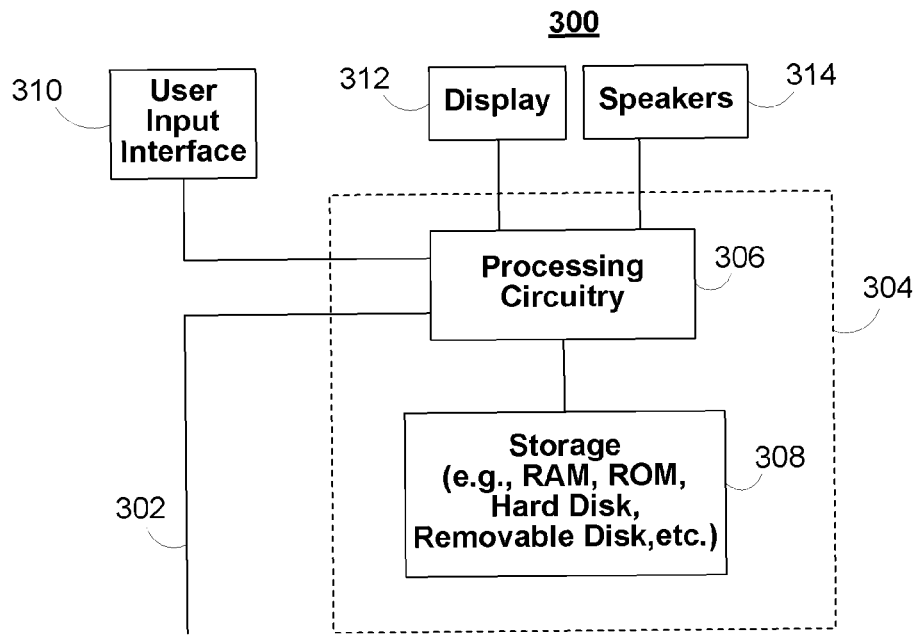
FIG. 3 shows an illustrative user equipment device in accordance with another embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below). In some embodiments, the communications circuitry may receive an interactive table of contents with computer language instructions and time indicators. The interactive table of contents may be used by the media guidance application determine at what point in a media asset to execute the computer language instructions to cause the display of interactive content.

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions). Storage 308 may be used to store the interactive table of contents and in some embodiments time indicators received over the communications medium.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308. In some embodiments, control circuitry 304 may execute computer language instructions corresponding to the interactive table of contents and may cause the display of interactive content with the media asset. Control circuitry 304 may process input from the user corresponding to the displayed interactive content.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314. In some embodiments, user input interface 310 may be used to provide responses to interactive content provided on the display screen.

The guidance application may be implemented using any suitable architecture. For example, it may be a stand-alone application wholly implemented on user equipment device 300 (e.g., a media equipment device). In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
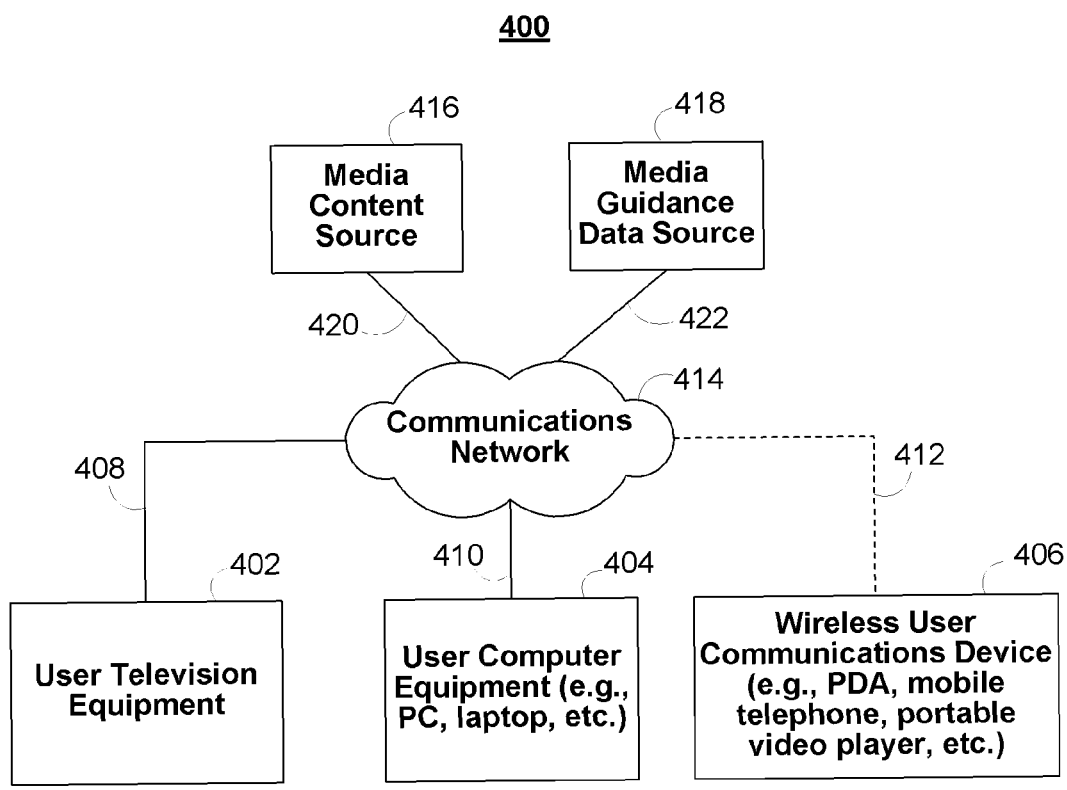
FIG. 4 is a diagram of an illustrative cross-platform interactive media system in accordance with another embodiment of the invention.

User equipment device 300 (e.g., the media equipment device) of FIG. 3 can be implemented in system 400 of FIG. 4 as user television equipment 402, user computer equipment 404, wireless user communications device 406, or any other type of user equipment suitable for accessing media, such as a non-portable gaming machine or a robot. For simplicity, these devices may be referred to herein collectively as user equipment or user equipment devices or media equipment device(s). User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a robot, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety. In some embodiments, media content source 416 may include a master storage medium from which a media asset and interactive table of contents corresponding to the media asset are retrieved and provided to the media equipment device.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections. In some embodiments, media guidance data source 418 may provide the interactive table of contents corresponding to a media asset provided by media guidance content source 416.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content or scheduled media asset events (e.g., reminders for media assets). For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, program orders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,914, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, interactive content may be provided by an author or writer during the authoring process of a script of a screenplay of a media asset. As referred to below, the term "script" should be understood to mean the text document that a writer creates (e.g., using word processing software or drafting a handwritten document) from which a media asset is produced, filmed, edited, stored and transmitted. In particular, the script may be a screenplay document that describes scenes, actors and dialog necessary in the production of a media asset. The interactive content may be uniquely defined in the script using natural language annotations. Timing contingencies that define the period during which to display the interactive content may also be provided using natural language annotations. In should be understood that natural language textual annotations are words or phrases that are commonplace to the writer or author and do not include language used by computer programmers in writing computer language instructions. The natural language annotations may be words or phrases that represent the way the author or writer speaks to another human being.

The script may be read or parsed by an editing system after the media asset has been produced. The editing system may retrieve the textual annotations and convert the textual annotations to computer language instructions (e.g., computer language code) that may be executed to display the interactive content defined by the textual annotations at the media equipment device at the right time. The editing system may also edit the produced media asset and stored the edited media asset and computer language instructions on a master storage medium (e.g., a master tape or disc). The interactive content may include one or more of the following: a challenge question having multiple choice answers, a puzzle (e.g., re-arranging letters of an actor, title or theme of the media asset), a video game, or a memory game.

The master storage medium may be used by a central transmission facility to broadcast the media asset and computer language instructions to a plurality of users at media equipment devices. Each media equipment device may store the computer language instructions locally and at the appropriate time of the media asset playback (e.g., the time interval defined by the textual annotations in the script) display the interactive content corresponding to the computer language instructions. In some implementations, the time interval during which the interactive content is displayed may correspond to one or more commercial breaks during the broadcast of the media asset.

Figure 8:
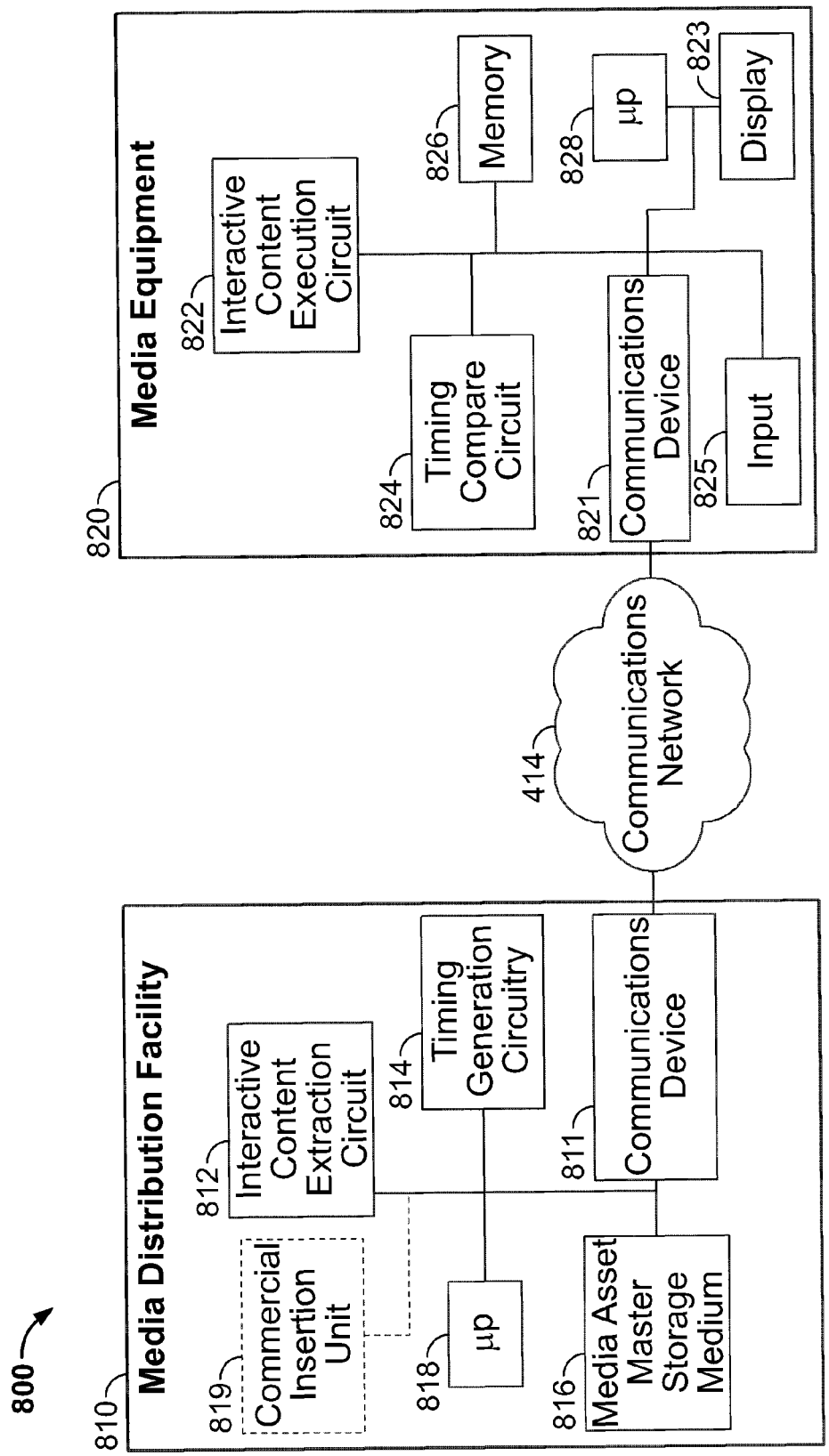
FIG. 8 shows an illustrative media asset and interactive content distribution system in accordance with an embodiment of the invention.

As discussed in more detail below, FIGS. 5-7 and 12 relate to and illustrate the process of creation or drafting of the interactive content during authoring of the script (e.g., pre-production of the media asset) of the media asset and the editing process leading up to the storage of the media asset and computer language instructions representing the interactive content on a master storage medium. FIG. 8 relates to and illustrates the transmission of the media asset and computer language instructions from the master storage medium to a media equipment device. FIGS. 9-11 and 13 and 14 relate to and illustrate the process of presenting or displaying the interactive content with the media asset during playback at the media equipment device.

Figure 5:
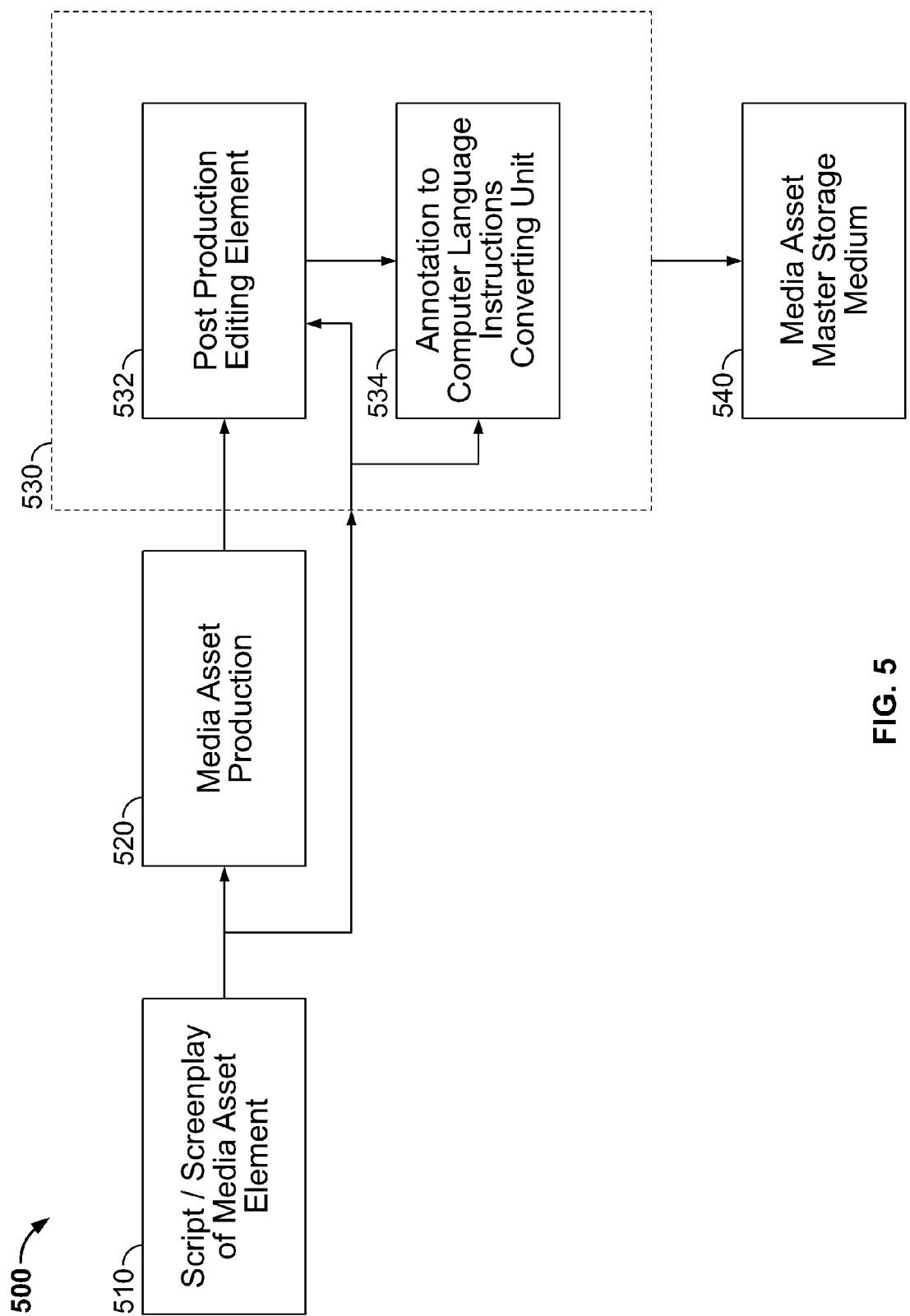
FIG. 5 is a diagram of an illustrative interactive content creation and embedding system in accordance with an embodiment of the invention.

FIG. 5 is a diagram of an illustrative interactive content creation and embedding system 500 in accordance with an embodiment of the invention. System 500 may include a script of a media asset creation element 510, media asset production element 520, media asset editing element 530 and media asset master storage medium 540. Although each element in system 500 is drawn separately it should be understood that the elements drawn in system 500 may be combined or further separated in any suitable manner.

Script of a media asset creation element 510 may be a workstation through which the author or writer drafts the script of the screenplay of the media asset. In some embodiments, media asset creation element 510 may be a computer that executes or provides access to script writing or drafting software such as "Final Draft" or "Microsoft Word" or any other suitable word processing document. Writer and author are used interchangeably throughout the specification but should be understood to mean the person who writes the script of the media asset.

In some embodiments, the author may add natural language textual annotations at one or more points in the script of the media asset. The textual annotations may uniquely define interactive content that the author would like to have presented at a certain point in the display of the media asset corresponding to the script. In particular, the author may add or include interactive content annotations that are directed to the subject matter of a particular scene of the media asset. In some implementations, interactive content such as some trivia, prediction, memory or other challenge may be provided for every line of dialog in the script. In some implementations, the interactive content may be provided for every action description in the script. Action description or action lines are points in the script that define a scene, credits, commercial breaks, soundtracks and other similar media asset elements. For example, if interactive content is provided for every action description, the interactive content may be provided about every two minutes of playback of the media asset but usually it would be less frequently.

In some implementations, the interactive content may be provided during commercial breaks that occur when the media asset corresponding to the script is being played back on a media equipment device. The motivation for providing the interactive content during commercial breaks is to persuade viewers to watch more commercials and raise the effectiveness of advertising. Authors may possess the creativity to keep viewers interested in interacting with the interactive content as much as the viewers enjoy playing back the media asset. Accordingly, there is a great benefit to having the interactive content defined by the authors during the script writing process and not a programmer at some point post-production.

When writing the script and the annotations that define the interactive content, there may be uncertainty about exactly where the commercials will appear when the media asset corresponding to the script is produced and played back. Also, the length of the commercial breaks may change over time and may depend on the broadcast source of the media asset. In particular, a three minute commercial break when one network (e.g., ABC) is transmitting the media asset may become two and a half minutes on another network (e.g., FOX). To cope with the uncertainty as to length and place of commercial breaks, the author may provide timing contingencies in the annotations to indicate to the downstream system (e.g., media asset editing element 530) at what subject-matter point in the script (e.g., a reference point) to display the interactive content instead of at what time point. As discussed in more detail below, media asset editing element 530 may translate the annotation timing contingencies into actual time codes associated with playback of the media asset as that information is available to media asset editing element 530 after the media asset is produced by media asset production element 520.

For example, the author of the script may insert an annotation the uniquely defines interactive content at a first position in the script (e.g., after the first line of scene 3 is spoken). The author may provide timing contingency for the interactive content indicating that the interactive content is to be displayed until a second position in the script is reached. In particular, the author may use reference points (e.g., referring to scenes and lines) to indicate to the downstream system when to display and when to remove from display the interactive content. More specifically, because the author writes the script of the media asset with several climax points, the author can assume that commercial breaks will be provided shortly after each climax point. Accordingly, the author may add the annotation for the interactive content with a timing contingency based on the climax point such that the interactive content is caused to be displayed after the climax point is reached.

In some embodiments, the interactive content may be a question that relates to a first scene and which may be answered in a subsequent second scene. The author may provide timing contingencies for the interactive content to ensure that the interactive content or at least the response to the interactive content displayed after the first scene is no longer valid or is prevented from being displayed after the second scene is presented. In particular, the timing contingency may provide first and second reference points indicating to the downstream system to display and accept responses to the interactive content only during the playback time period between the first and second reference points. In some implementations, the interactive content may be displayed for the duration of playback of the media asset and accordingly the timing contingency may simply indicate when to start displaying the interactive content.

In some embodiments, the author may provide multiple interactive contents all corresponding to the same reference points in the media asset in the script. Each of the multiple interactive contents may include timing contingencies that cause them to be displayed in a particular order based on whether the media asset is a first run (e.g., being played back or transmitted for the first time) or a rerun. For example, a first interactive content may be associated with a timing contingency that defines the start and end points in the script as well as a count value of zero which represents the media asset being a first run. A second interactive content may be associated with a timing contingency that defines the same start and end points as the first interactive content in the script as well as a count value of more than zero which represents the media asset being a rerun. The editing system downstream may provide computer instructions (discussed in greater detail below) indicating to the media equipment device which of the first and second interactive contents to display during particular interval based on whether the transmission facility indicates to the media equipment device that the media asset is a first run or rerun.

The final product of script of media asset production element 510 may be a document similar to the one shown in FIG. 6. In particular, FIG. 6 is an illustrative script of a screenplay document 600 created by script of media asset element 510 and provided to media asset production element 520 and media asset editing element 530. Document 600 may include a scene description 610 which may be an action description or action line, dialog 620 and an annotation 630 that defines uniquely interactive content and timing contingencies during which to display the interactive content. Document 600 illustrates a portion of an entire script of a screenplay of a media asset.

As shown, scene description 610 provides the description for the third scene in the media asset. Scene description 610 may similarly be a commercial action line, song or other action segment of the media asset. Scene description 610 may be a first reference point in the document 600 of the script. Scene description 610 provides the production team with a description of how the author envisions the details of the setting for the filming of the particular portion of the media asset. Dialog 620 provides the conversations that take place between the actors in the setting corresponding to scene description 610. It should be understood that there may be multiple or hundreds of action descriptions such as scene description 610 throughout script shown in document 600.

The author has written an annotation 630 in document 600 to define interactive content for display during the scene corresponding to scene description 610. The placement of annotation 630 between the two dialog portions indicates to the editing system to create computer language instructions to cause the display of the interactive content between the two dialog portions during playback. Annotation 630 may uniquely define the interactive content using a first identifier 640 of the type of interactive content and a second identifier 650 of the method of presentation of the interactive content. In particular, first identifier 640 may indicate that the interactive content is a trivia or question and second identifier 650 indicates that the response type and presentation is in the form of a multiple choice question. In some embodiments, the types of interactive content identified by first identifier 640 may include memorization, a puzzle, a video game.

The interactive content annotation 630 may provide the question or puzzle or game that the author writes. Annotation 630 may include a timing contingency 660. Timing contingency 660 indicates to the editing system the time interval during which to cause the interactive content to be displayed. For example, timing contingency 660 may indicate to editing system to display the interactive content starting at the point in the media asset playback after the character Joey says "No, things are fine . . . " and to terminate the display of the interactive content and not accept any responses after scene 9 (e.g., a reference to an action line) begins. Other timing contingencies may indicate a termination point for the display of the interactive content by referring to a line of dialog (by number of statement made by a character), a commercial segment, a scene starting or ending point, a point of entry of a character, or any other suitable reference to event that occurs during the media asset playback.

In some embodiments, the presentation of interactive content may allow viewers to receive points for correct responses. In some implementations, the accumulation of a predetermined number of points may be exchanged for prizes (e.g., music downloads, presents, physical gifts, iPhones, iPods, portable devices, access to pay-per-view movies, or digital copies of the media assets). The author may assign a point value for the displayed interactive content in annotation 630. For example, point value definition 670 may indicate to editing system to produce computer language instructions that assign 125 points to users who respond to the interactive content correctly or within a defined time limit. In some implementations, the point value definition 670 may provide for a decreasing or increasing point value. In particular, point value definition 670 may indicate to editing system to produce computer language instructions that increase or decrease the value of the points available for responding correctly to the interactive content every five seconds (or other suitable time period) to reward or penalize users who respond too fast or too slowly.

Media asset production element 520 may include production equipment (e.g., cameras, scenes, actors, directors, etc.) for filming and creating the media asset corresponding to the script provided by scrip of media asset element 510. The output of media asset production element 520 is a digital or analog representation of the media asset including every take that was filmed. In particular, the media asset produced by media asset production element 520 may include multiple takes of the same scene in order to allow subsequent selection of the best take for inclusion in the final edited version of the media asset for provision to the viewers.

Media asset editing element 530 may receive the unedited version of the media asset and may cut out and fix all the segments of the media asset to produce a final version of the media asset for delivery to the viewers. Media asset editing element 530 may also receive a copy of document 600 (e.g., either a digital reproduction of document 600 or a hard paper copy version of document 600) provided by script of media asset element 510. Media asset editing element 530 may generate computer language instructions that represent the interactive content and timing contingencies specified in annotations of the script in document 600. Media asset editing element 530 may include a post production editing element 532 and an annotation to computer language instructions converting unit 534.

Post production editing element 532 may be a workstation running video editing software such as "Final Cut Pro" or other suitable video editing tools or software. Post production editing element 532 may be used to edit, cut, modify and add special video and audio effects to the filmed media asset.

Post production editing element 532 may work in tandem, separately, sequentially or in parallel with computer language instructions converting unit 534 to generate computer language instructions for the interactive content. In some embodiments, computer language instructions converting unit 534 may be a workstation which a person operates to generate computer language instructions that represent the interactive content defined by the annotations in the script. In particular, computer language instructions converting unit 534 may generate the computer language instructions by receiving input from the operator in a text document which provides computer code that represents the interactive content. The computer code may be compiled to generate binary computer language instructions (which may be unreadable to a human person) that processing circuitry 306 may execute to display the interactive content in the right manner and at the appropriate time set by the timing contingencies.

In some implementations, a person at computer language instructions converting unit 534 may read the lines in the script to identify places in the script where the author has inserted annotations. Once an annotation is identified, computer language instructions converting unit 534 may be used to identify the time point in the edited film corresponding to the annotation. In particular, computer language instructions converting unit 534 may receive the output of post production editing element 532. The output of post production editing element 532 may be the final version of the media asset that will be provided to end users. Computer language instructions converting unit 534 may be used to find the time location in the final version of the media asset where the line of dialog preceding or following the annotation is or the position in time of the start or end of the scene where the annotation is in the script (e.g., the start point). In some implementations, the person at computer language instructions converting unit 534 may playback the final edited version of the media asset to find the location in the edited media asset where the annotation is to be placed. Once the location is identified, the person may insert a bookmark or some other representation to allow the computer language instructions to identify the point at which to execute the code to cause the interactive content to be displayed. This point in time may be referred to as the time code. In particular, when generating the computer language instructions, the operator may use the time code associated with the start point as a reference as to when the media equipment device program should begin executing the corresponding computer language instructions and accepting user responses.

The operator at computer language instructions converting unit 534 may also determine whether the annotation includes a timing contingency during which the interactive content is to be displayed. When a timing contingency is defined in the script, the operator may determine by which scene or line of dialog or action line the display of the interactive content is to be terminated or by which scene or line of dialog or action line user responses should be received (e.g., the end point). The operator may then find the time code or time location in the final version of the media asset corresponding to the scene or line of dialog or action line the display of the interactive content is to be terminated or by which scene or line of dialog or action line user responses should be received. When generating the computer language instructions, the operator may use the time code associated with the end point as a reference as to when the computer language instructions should terminate execution or ignore subsequent user responses.

In some embodiments, the annotations may include a point awarding mechanism definition. The person at computer language instructions converting unit 534 may write and generate computer language instructions that instruct processing circuitry 306 at the media equipment device on how to award points. For example, the computer language instructions may instruct processing circuitry 306 with how many points to award for correct answers and whether time increased or decreased scoring is necessary for the displayed interactive content. When time increased or decreased scoring is necessary, the person may generate the computer language instructions with timing information as to when to decrease or increase the points and by how much based on the annotation in the script.

In some embodiments, computer language instructions converting unit 534 may allow the operator find and read an annotation in the script at the same time as playing back the final edited version of the media asset. Based on the annotation and the contingencies that define the start and end points and point awarding mechanism, the operator may write computer language instructions (e.g., HTML, JAVA, C++, XML, C, PERL, and the like) that represent and that may be executed to cause the interactive content to be displayed by the media equipment device. The computer language instructions may be based on the software or application that runs on the end user media equipment device while a user watches a program or media asset and that may be used to provide interactive content. In some embodiments, the software or application may be a web browser that is capable of executing HTML code and accordingly the computer language instructions may be in HTML format.

In some implementations, computer language instructions converting unit 534 may generate an interactive table of contents or may add to an interactive table of contents provided by post production editing element 532 that includes a list of time codes identifying substantially exact points in time in the media asset where specific events (e.g., start or end of scenes, commercial breaks, or places where interactive content is inserted) occur. An exemplary interactive table of contents 700 which may be output by computer language instructions converting unit 534 is shown and described below in connection with FIG. 7. In some embodiments, when the media asset is formatted in MPEG-7, converting unit 534 may add descriptions of portions or scenes of the media asset in a data structure associated with the media asset. In particular, the metadata provided with a MPEG-7 media asset may include similar information as the interactive table of contents. An event that is associated with interactive content may identify the data (e.g., the compiled binary instructions) corresponding to the interactive content either explicitly (e.g., by including the computer language instructions such as HTML that may be used to executed the interactive content in interactive table of contents 700) or implicitly (e.g., by including a reference to a storage location of the data and computer language instructions that may be used to executed the interactive content). In some implementations, data corresponding to the interactive content may be implicitly identified by the event in table of contents 700 by providing a reference to a webpage or storage location on a remote server from which the computer language instructions corresponding to the interactive content may be retrieved for execution. As discussed in more detail below in connection with media equipment 820 (FIG. 8), processing circuitry 306 on the media equipment device may locally store the interactive table of contents and parse through the information (e.g., the time codes and events) to determine when in the playback of the media asset to display and terminate the display of interactive content.

For example, interactive table of contents 700 may include time code indicators 710 and event indicators 720. Each time code indicator 710 identifies a unique point in time of playback of the media asset. Each event indicator 720 identifies an event that occurs or that should occur (e.g., execution of interactive content) at the corresponding unique point in time identified by the time code indicator 710. For example, a first time code indicator 712 identifies that the media asset has been played back for exactly four minutes and zero seconds. At that unique point in time a first event indicator 760 identifies the event that occurs. In particular, first event indicator 760 may include information that processing circuitry 306 may interpret or process to determine whether interactive content is to be displayed. In particular, first event indicator 760 includes a description of a first challenge 730 to be displayed along with timing information 740 as to when to display first challenge 730 and the point mechanism 750.

In some embodiments, first challenge 730 in interactive table of contents 700 may include binary code corresponding to the interactive content that was placed in the media asset based on annotations in the script written by the author as well and that corresponds to the timing information 740. Alternatively, first challenge 730 may include a storage location identifier which may be used by processing circuitry 306 to retrieve the binary instructions corresponding to the interactive content that was placed in the media asset based on annotations in the script written by the author as well and that corresponds to the timing information 740. In some implementations, event indicators that correspond to interactive content may include references to storage locations or the binary data of computer language instructions that instruct processing circuitry 306 as to how to display the interactive content and may include other data that may be interpreted by processing circuitry 306 to determine the time interval in which to execute the computer language instructions and the point awarding mechanism to use. More specifically, in first event indicator 760, first challenge 730 may be binary code and not human readable, while timing information 740 that identifies the time interval during which to execute the computer language instructions and point mechanism 750 are human readable. In some implementations, timing information 740 and point mechanism 750 may be parsed and interpreted by processing circuitry 306 to determine the time interval and point awarding mechanism corresponding to the interactive content.

Event indicators 720 may indicate various points in the media asset. For example, event indicators 720 may indicate starting points of commercial breaks, starting points of the media asset playback, ending points of the media asset playback, starting points of opening credits, ending points of opening credits, starting points and ending points of various Acts in the media asset and other suitable action events that may be defined in the script written by the author.

In some embodiments, multiple copies of interactive table of contents 700 may be stored at various locations throughout media asset storage medium 540. In particular, a first copy of interactive table of contents 700 may be stored at the point in media asset master storage medium 540 corresponding to the beginning of playback of the media asset and other copies of interactive table of contents 700 may be stored at one minute (or other suitable time length) sequential time points after the point corresponding to the beginning of playback of the media asset. For example, a second copy of interactive table of contents 700 may be stored at one minute after the beginning point of playback, a third copy of interactive table of contents 700 may be stored at two minutes after the beginning point of playback and each subsequent copy may be stored in a similar manner or in any other random or pseudo random points of playback. The spacing in time between each copy of interactive table of contents 700 may be based on how often interactive table of contents 700 is to be provided to the media equipment device where the interactive content is displayed. The spacing in time may be set by the author of the script or by annotation to computer language instructions converting unit 534. In some embodiments, only one copy of interactive table of contents 700 may be stored with the media asset on media asset master storage medium 540. In such circumstances, copies of interactive table of contents 700 may be provided to the end user media equipment device at different time intervals set by the transmission facility by retrieving interactive table of contents 700 from the single storage location. In some implementations, the transmission facility may redact the retrieved interactive table of contents 700 to avoid including information in interactive table of contents 700 that relates to playback time periods of the media asset which have passed.

In some implementations, each subsequent copy of interactive table of contents 700 may be a further redacted copy of interactive table of contents 700. In particular, the first copy of interactive table of contents 700 may include time code indicators 710 and event indicators 720 for the entire media asset playback and the second copy of interactive table of contents 700 which may be placed one minute after the beginning of the playback position may include time code indicators 710 and event indicators 720 starting with the time code indicator following the one minute runtime and excluding time code indicators 710 and event indicators 720 the precede the one minute playback position of the media asset.

In some embodiments, annotations to computer language instructions converting unit may add time code information to the edited media asset. In particular, a time code stamp may be placed at each frame or millisecond (or some other suitable granularity of time) of the media asset. The time code stamp may identify the title, episode and/or broadcast time of the media asset and the frame or millisecond corresponding to the frame being transmitted or played back. The time code stamp may be transmitted or broadcast by the transmission facility along with the frame of the media asset to the end user media equipment device. For example, a sequence of three time code stamps that may be added to the edited media asset at every second of playback may be "29:01:00 FamilyGuy Season5 Episode 3," "29:02:00 FamilyGuy Season5 Episode 3," and "29:03:00 FamilyGuy Season5 Episode 3." Where FamilyGuy Season5 Episode 3 identifies the current media asset being played back and transmitted and 29:02:00 identifies the minutes:seconds:frame of the media asset playback.

In some embodiments, computer language instructions converting unit 534 may be an automated computer or server that operates to generate computer language instructions that represent the interactive content defined by the annotations in the script. In particular, all of the above described processes that the operator performs with respect to the edited media asset and script to generate the computer language instructions may be performed automatically. For example, the annotations in script 600 may be made in accordance with a predefined standard that a computer may interpret to generate corresponding computer language instructions. In particular, a natural language annotation may be made in accordance with a predefined standard such that when the natural language annotation is parsed by computer language instructions converting unit 534, a mapping between the annotation and computer language instructions may be determined to retrieve the computer language instructions corresponding to the annotation. The parameters of the annotation (e.g., the text of the question and answers, the point value or the timing contingencies) may be used as the parameters input to the computer language instructions functions. For example, a natural language annotation may be made that indicates MP:question:answer:pointvalue. Computer language instructions converting unit 534 may retrieve computer language instructions corresponding to a multiple choice question because MP may represent a multiple choice question and may populate the question and answer in accordance with the text provided in question and answer fields of the natural language annotation and may also assign the point value based on the amount indicated in the pointvalue field of the natural language annotation. Although at first the natural language annotations may appear like computer language instructions, they are actually simpler to an author to understand and use to place into the script than actual computer language instructions which require knowledge as to precise definition and tags and are prone to many errors.

Computer language instructions converting unit 534 may automatically identify start and end time points in the media asset where annotations in the script are present and at which to insert the computer language instructions. For example, computer language instructions converting unit 534 may process the final edited version of the media asset and use digital to analog conversion to convert speech in the media asset to text. Computer language instructions converting unit 534 may compare the text form of the speech to text in the script to identify points in time of the media asset that correspond to the script. When an annotation is reached in the script while processing the media asset speech, computer language instructions converting unit 534 may insert a reference point to that location in order to cause the computer language instructions corresponding to the interactive content to be executed. Similarly, computer language instructions converting unit 534 may identify the end point corresponding to the display of the interactive content and add a reference point to the end point in instruct a downstream component to terminate execution of the computer language instructions and/or ignore future input received after that point.

The output of media asset editing element 530 may be the finalized version of the produced and edited media asset as well as computer language instructions that represent the interactive content and timing contingencies during which to display the interactive content. The output of media asset editing element 530 may be stored on media asset master storage medium 540 such that the computer language instructions representing the interactive content and timing contingencies are embedded with the media asset on the same master storage medium 540. The embedding of the computer language instructions may ensure that the interactive content always be displayed when the media asset is accessed or displayed and also may prevent tampering with the interactive content or computer language instructions downstream post production. In particular, media asset master storage medium 540 may include the finalized edited version of the media asset, time code information corresponding to the media asset, interactive table of contents 700 and data corresponding to computer language instructions representing the interactive content. In some implementations, media asset master storage medium 540 may also store the digital representation of script 600 corresponding to the stored media asset.

Media asset master storage medium 540 may be used to transmit or broadcast the media asset and interactive content written by the author to multiple end user media equipment devices. For example, media asset master storage medium 540 may be used by a media asset distribution facility (e.g., cable transmission facility, satellite transmission facility, fiber optic transmission facility, streaming or downloading from the Internet, or terrestrial transmission facility) to broadcast the media asset to end users for playback or recording on the end user media equipment devices. Media asset master storage medium 540 may be used to generate video tapes, DVDs, Blu-Ray disks, high-definition disks, optical storage mediums that the user may use with the media equipment device to playback the media asset. It should be understood, that no matter how the media asset gets delivered to the end user (e.g., by broadcast, download or storage), the computer language instructions that represent the interactive content get delivered in the same way or different way simultaneously with the media asset playback.

FIG. 8 shows an illustrative media asset and interactive content distribution system 800 in accordance with an embodiment of the invention. System 800 may include a media distribution facility 810, communications network 414 (FIG. 4) and media equipment 820. Media distribution facility 810 may have the same or similar functionality as media content source 416 (FIG. 4) and media equipment 820 may have the same or similar functionality as user equipment device 300 (FIG. 3). In some implementations, media distribution facility may be a cable headend and/or satellite uplink/downlink facility.

Media distribution facility 810 may include a commercial insertion unit 819, an interactive content extraction circuit 812, a processing element 818, timing generation circuitry 814, media asset master storage medium 816 and communications device 811. Media asset master storage medium 816 may store a collection of media asset master storage mediums 540 (FIG. 5) corresponding to different media assets. In some embodiments, processing element 818 may retrieve a media asset master storage medium 540 from media asset master storage medium 816 corresponding to the media asset scheduled for broadcast at the current time. The media asset may be transmitted and/or broadcast to a plurality of media equipments 820 over communications network 414 using communications device 811. In particular, processing element 818 may playback the content of the retrieved media asset master storage medium 540 for transmission and display on a display 823 of media equipment 820.

In some embodiments, processing element 818 may determine locations within the retrieved media asset master storage medium 540 in which to insert commercials. For example, the media asset on media asset master storage medium 540 may include a blank time interval (e.g., 2-4 minutes long) during which commercials may be inserted. Processing element 818 may retrieve a commercial from commercial insertion unit 819 and playback the retrieved commercial during the blank time interval of the media asset. In some embodiments, processing element 818 may determine the length and placement of the commercial blank time interval by parsing through and examining the interactive table of contents stored with the media asset on media asset master storage medium 540. In particular, processing element 818 may compute the current time position in the playback of the media asset either through the time code information or by measuring time starting from the scheduled broadcast time and identify the event indicator associated with the time indicator for the current time position. When the event indicator identifies a commercial break, processing element 818 may retrieve and playback a commercial during the identified commercial break.

Commercial insertion unit 819 is drawn in dashed lines as being an optional component. In particular, media distribution facility 810 may provide the media asset on a pay-per-view channel or through the Internet and may not display commercials during the commercial breaks. In such circumstances, processing element 818 may use the interactive table of contents to skip the commercial breaks by playing back only those portions of the media asset that pertain to the content and not to the blank time interval. Processing element 818 in such circumstances may transmit or execute the computer language instructions corresponding to the interactive content that would otherwise be provided during the commercial break at time points in the media asset playback substantially near where the commercial breaks would be. Processing element 818 may avoid executing computer language instructions that pertain to interactive content that correspond to a timing contingency which allows the interactive content to only be displayed during the commercial breaks. In some implementations, processing element 818 may only execute the computer language instructions that correspond to interactive content that is not associated with a timing contingency.

In some embodiments, timing generation circuitry 814 may provide time code information for the media asset currently being played back by media distribution facility 810. The time code information may be generated for transmission at each frame or millisecond (or some other suitable granularity of time) of the media asset. The time code information may be used by media equipment 820 to synch the local application to the playback of the media asset. As discussed below in connection with media equipment 820, media equipment 820 may determine the current time position within the media asset playback and the interactive table of contents based on the received time code information.

The time code information may identify the title, episode and/or broadcast time of the media asset and the frame or millisecond corresponding to the current frame being transmitted or played back. For example, a sequence of three time code information that may be transmitted sequentially with the media asset being played back at every second of playback may be "29:01:00 FamilyGuy Season5 Episode 3," "29:

02:00 FamilyGuy Season5 Episode 3," and "29:03:00 FamilyGuy Season5 Episode 3." Where FamilyGuy Season5 Episode 3 identifies the current media asset being played back and transmitted and 29:02:00 identifies the minutes:seconds:frame of the media asset playback. Processing element 818 may indicate to timing generation circuitry 814 (e.g., by way of providing a reset signal to timing generation circuitry 814) the precise time when processing element 818 starts playback of the media asset. In some implementations, timing generation circuitry 814 may be excluded, turned OFF or not used when media asset master storage medium 540 already includes time code stamps with the media asset. In such circumstances, processing element 818 may retrieve the stored time code stamp from media asset master storage medium 540 and transmit the retrieved time code stamp with the media asset.

In some embodiments, interactive content extraction circuit 812 may retrieve from media asset master storage medium 540 the interactive table of contents and computer language instructions corresponding to the media asset being played back and store the retrieved information. Interactive content extraction circuit 812 may transmit the retrieved interactive table of contents and computer language instructions to media equipment 820. In some implementations, media equipment 820 may locally store the interactive table of contents and computer language instructions in a memory 826. In some implementations, interactive content extraction circuit 812 may only transmit the interactive table of contents to media equipment 820 and may retain at media distribution facility 810 the corresponding computer language instructions. This may be desirable when the transmission bandwidth is limited or when storing a large amount of data to memory 826 is not optimal. In such circumstances, media equipment 820 may retrieve the corresponding computer language instructions based on references in the interactive table of contents as they become needed (e.g., when the time code matches a time indicator in the interactive table of contents that is associated with an event indicator identifying interactive content).

In some embodiments, interactive content extraction circuit 812 may transmit only portions of the interactive table of contents and corresponding computer language instructions to media equipment 820. For example, interactive content extraction circuit 812 may transmit the interactive table of contents and corresponding computer language instructions in their entirety when the media asset begins playback. After a predetermined period of time (e.g., five minutes), interactive content extraction circuit 812 may only transmit the portions of interactive table of contents and corresponding computer language instructions that relate to portions of the media asset following in time the first five minutes of playback. This may be desirable to reduce the amount of information that is transmitted to media equipment 820 as the information corresponding to previously played back portions of the interactive table of contents may be unnecessary.

In some implementations, the transmission of the interactive table of contents and/or computer language instructions may be made through a communications path different from the communications path through which the media asset is transmitted. In particular, the media asset may be transmitted to media equipment 820 for display through a cable transmission medium while the interactive table of contents and corresponding computer language instructions may be transmitted over the Internet. In some embodiments, the transmission of the interactive table of contents and/or the computer language instructions may be performed through and at the vertical blanking interval (VBI) of the media asset.

In some embodiments, processing element 818 may determine based on the interactive table of contents and the current playback position whether interactive content is to be displayed. When processing element 818 determines that interactive content is to be displayed, processing element 818 may instruct interactive content extraction circuitry 812 to retrieve the computer language instructions corresponding to the event indicator associated with the time code indicator corresponding to the current time. The time code indicator may correspond to the current time when the current time is equal to or greater than the time code indicator provided in the interactive table of contents. In some implementations, interactive content extraction circuit 812 may continuously monitor the current time and compare the current time with a next time code indicator to determine whether a corresponding event indicator in the interactive table of contents identifies the need for display of interactive content. When interactive content extraction circuit 812 determines that the event indicator identifies a need for interactive content, interactive content extraction circuit 812 may generate an interrupt signal for processing element 818 indicating to processing element 818 the need to execute computer language instructions that represent the interactive content. In some implementations, when the media asset is provided in MPEG-7 format, processing element 818 may determine whether to display interactive content based on metadata provided with the media asset in the MPEG-7 format. In particular, the media asset may include scene descriptions or position descriptions or whether commercial breaks are coming up and based on those descriptions, processing element 818 may determine which interactive content to display and when to display the interactive content.

Processing element 818 may execute the retrieved instructions to include the interactive content in the playback display signal provided to media equipment 820. Display 823 on media equipment 820 may as a result display the media asset being played back (e.g., the commercial inserted at a commercial break) along with the interactive content inserted by processing element 818. In such circumstances, the storage of the interactive table of contents and computer language instructions in memory 826 may be avoided as well as the execution at the appropriate time (e.g., when the current time corresponds to a time code indicator which is associated with an event indicator which identifies interactive content) of computer language instructions.

Media equipment 820 may receive the media asset being played back from media distribution facility using communications device 821. Media equipment 820 may display the media asset that is received on display 823. Processing element 828 may provide the received interactive table of contents to interactive content execution circuit 822 and to memory 826 for storage. Interactive content execution circuit 822 may parse the received interactive table of contents to identify event indicators that identify interactive content. For each event indicator that identifies interactive content, interactive content execution circuit 822 may determine the start and end times for display of the interactive content. In some implementations, the start time may be the time code indicator associated with the event indicator in the interactive table of contents. In some implementations, the end time may be computed or determined by interactive content execution circuit 822 by reading timing contingency information stored for the event indicator. For example, the event indicator may identify the end point for display of the interactive content by referring to another time code indicator, by referring to another event indicator or by referring to a particular dialog that is spoken in the media asset.

In some embodiments, interactive content execution circuit 822 may retrieve the time code indicators corresponding to the event indicators that identify interactive content. In particular, interactive content execution circuit 822 may retrieve the start time code indicator and/or end time code indicator and provide the time codes corresponding to the retrieved time code indicators to timing compare circuit 824.

Timing compare circuit 824 may monitor current time code information that is received corresponding to the current playback position of the media asset. When the current time code information corresponds to the time code timing compare circuit 824 received from interactive content execution circuit 822, timing compare circuit 824 may generate an interrupt and provide the interrupt signal identifying the corresponding time code to interactive content execution circuit 822. The time code information may be determined to correspond to the current playback position time code information when the current playback position time code information is equal to or greater than the value of the time code information stored in timing compare circuit 824. Interactive content execution circuit 822 may retrieve the event code corresponding to the time code indicator identified by the interrupt signal to identify and retrieve the corresponding computer language instructions. The computer language instructions may be retrieved either directly from the event indicator or by accessing another storage location identified by the event indicator. The storage location may be at a remote source such as at media distribution facility 810.

In some embodiments, interactive content execution circuit 822 may run an application that is suitable for executing the computer language instructions corresponding to the media asset and the interactive table of contents. For example, interactive content execution circuit 822 may run or execute an application such as a web browser that is capable of interpreting and executing HTML code. The application may cause the interactive content to be displayed on display 823 simultaneously with the media asset or commercial displayed in the commercial break.

In some embodiments, the application run by interactive execution circuit 822 may monitor input 825 for responses the user provides to interactive content displayed on display 823. When a response is received before the end point is reached, interactive content execution circuit 822 may determine whether the response is associated with a correct answer or an incorrect answer. For example, interactive content execution circuit 822 may compare the received response with an expected response by determining whether a match exists between the received response and the response indicated as correct in the event indicator. When a match is determined, interactive content execution circuit 822 may indicate to the user that the correct response was received and may determine from the event indicator the value of the correct response. Interactive content execution circuit 822 may increase the total score of the user from who a response was received over input 825 by the amount indicated by the event indicator for that interactive content. In some implementations, interactive content execution circuit 822 may determine the point value by measuring the time between when the interactive content was displayed and when the response was received over input 825. In particular, interactive content execution circuit 822 may increase or decrease the point value for a correct response based on the length of time the user took to respond to the interactive content correctly.

In some embodiments, multiple users may be viewing and accessing the same media equipment 820. In such circumstances, each user device may be associated with a unique identifier that is provided to media equipment 820 to identify a particular user. For example, two users may be accessing media equipment 820. When a first of the two users provides a response to the interactive content that is displayed, the input device used by the first user may provide a unique identifier of the first user concurrently with the response to media equipment 820. This may allow media equipment 820 to maintain a local score for each user in circumstances where multiple users are accessing media equipment 820. In some implementations, media equipment 820 may provide the score associated with each user to a central server for aggregation and comparison with other users in a network.

In some embodiments, interactive content execution circuit 822 may transmit a user identifier and the total accumulated point value to a central server or to media distribution facility 810 using communication device 821. The central server or media distribution facility 810 may track the total score of all the users accessing the media asset and responding to the interactive content to identify the user with the greatest number of points. The server or media distribution facility 810 may transmit to media equipment 820 a list with the highest and lowest scores to inform the user of the user's rank among the other competing users. In some embodiments, the user with the greatest number of points after a predetermined period of time (e.g., after accessing a certain number of media assets or watching for some time interval) may be rewarded with a prize (e.g., a music download, products, free access to media assets, etc.). The transmission of the point values to and from the server or media distribution facility 810 may be over the same transmission medium used to transmit the media asset or a different transmission medium.

In some embodiments, when a current playback time code information corresponds to a stored end point time code, timing compare circuit 824 may generate an interrupt and provide the interrupt to interactive content execution circuit 822. In some implementations, the current playback time code information corresponds to a stored end point time code when the current playback time code is equal to or greater than the value of the end point time code. When interactive content execution circuit 822 receives the interrupt indicating that the current playback time code information corresponds to an end point, interactive content execution circuit 822 may terminate the execution of the computer language instructions and terminate the display of the interactive content on display 823. When interactive content execution circuit 822 receives the interrupt indicating that the current playback time code information corresponds to an end point, interactive content execution circuit 822 may ignore the processing of any user input received after the end point.

In some embodiments, the commercial displayed in the commercial break may be associated with a priority level provided by media distribution facility 810. When the commercial displayed in the commercial break is associated with a priority level that exceeds a predetermined threshold, processing element 828 may prevent interactive content execution circuit 822 from displaying interactive content while the commercial is being displayed.

Although commercial insertion unit 819, interactive content extraction circuit 812, timing generation circuitry 814, timing compare circuit 824 and interactive content execution circuit 822 have been drawn as separate hardware components in media distribution facility 810 and media equipment 820, any one of the components may be excluded and implemented by software such that the functionality of the excluded component is provided by processing element 818 or 828.

Figure 9:
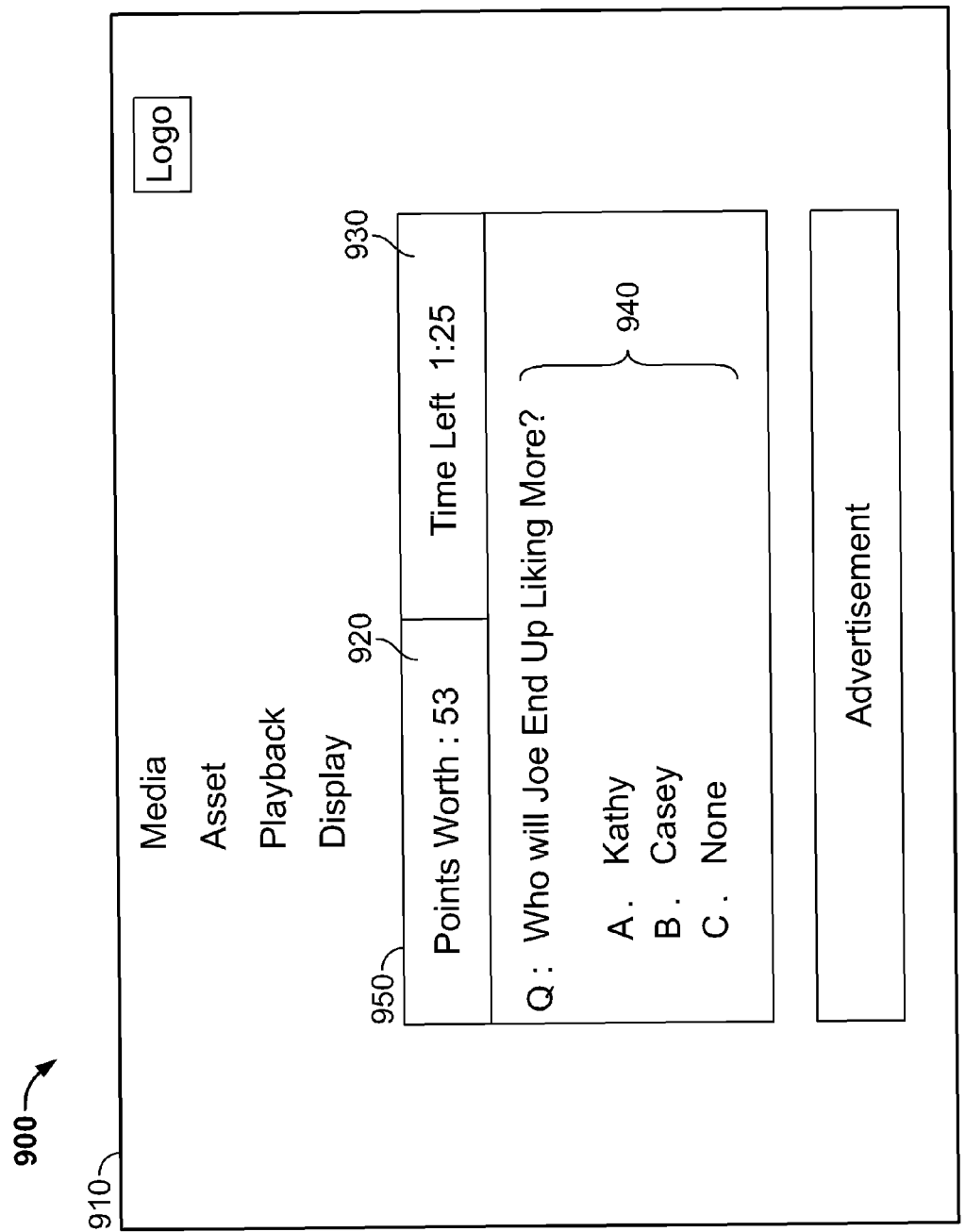
FIGS. 9-11 show illustrative display screens that the media equipment may provide in accordance with an embodiment of the invention.
Figure 10:
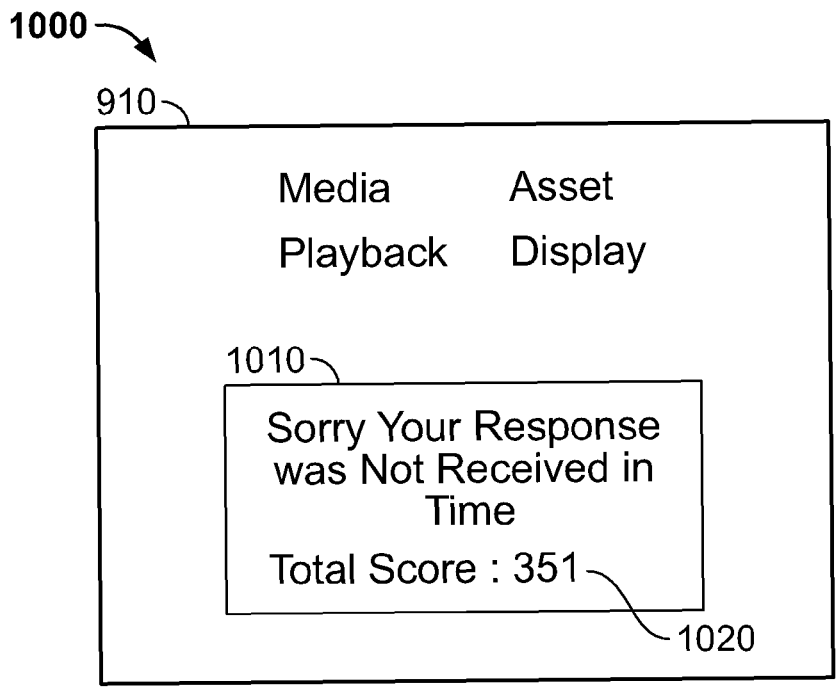
Figure 11:
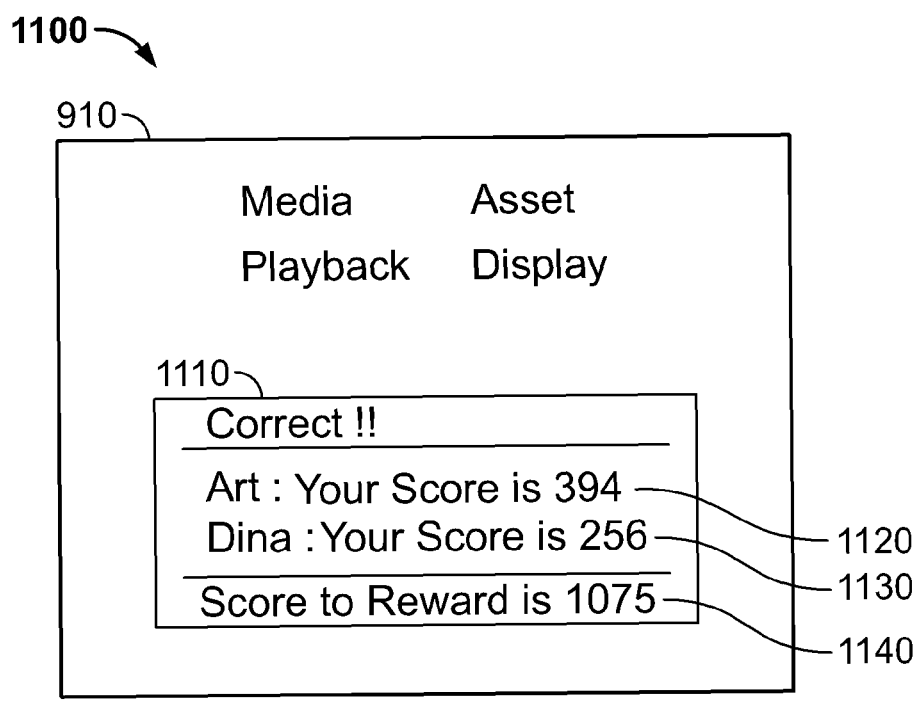

FIGS. 9-11 show illustrative display screens 900-1100 that media equipment 820 may provide on display 823 in accordance with an embodiment of the invention. Screen 900 may include a video 910 of a media asset being played back. When timing compare circuit 824 determines that received time code information corresponds to a time code of an event that identifies interactive content (e.g., during a commercial break), interactive content execution circuit 822 may execute the corresponding computer language instructions. In particular, interactive content execution circuit 822 may display with video 910 a prompt 950 with the interactive content 940.

For example, the computer language instructions corresponding to the event that corresponds to the received time code may represent a multiple choice question as the interactive content. Interactive content execution circuit 822 may run a web browser that interprets the computer language instructions in HTML and may display prompt 950 that includes the multiple choice question that was written in the script of the displayed media asset. The interactive content 940 displayed in prompt 950 may be the text of the multiple choice question.

Interactive content execution circuit 822 may determine from the computer language instructions the point value associated with the displayed interactive content. The point value 920 may be displayed in the prompt 950 to inform the user of the value of the points. In some embodiments, the value of the points may decrease or increase over time. Accordingly, point value 920 may be updated by interactive content execution circuit 822 based on the increase or decrease in point value over time specified by the computer language instructions.

In some embodiments, the interactive content may be associated with a timing contingency. Interactive content execution circuit 822 may determine how long the interactive content may be displayed for based on the computer language instructions. For example, interactive content execution circuit 822 may compute a difference in value between the time code indicator corresponding to the event indicator that identifies the displayed interactive content and the time code indicator by which the interactive content response is to be received. The difference between the two time code indicators may identify the maximum allowable time interval for response to the interactive content. Interactive content execution circuit 822 may display the computed time interval 930 in prompt 950.

When the time interval 930 during which responses may be accepted expires, any response received from the user after that time interval is not counted in the scoring. For example, when time compare circuit 824 receives time code information that corresponds to an end time code, interactive content execution circuit 822 may be instructed by the computer language instructions to not score subsequently received responses. When a response to the interactive content is received outside of the time interval 930, a prompt 1010 may be displayed. Prompt 1010 may include a message indicating that the response was not received within the timing contingency set by the author in the script and may include the total score 1020 of the user.

When an response to the interactive content is received from the user, interactive content execution circuit 822 may compare the received response with one or more correct responses. The correct responses may be indicated in the computer language instructions corresponding to the event indicator that identifies the interactive content to which a response has been received. When the received response matches one of the responses indicated to be correct responses, interactive execution circuit 822 may display a prompt 1110 informing the user that the received response or answer is correct. Interactive execution circuit 822 may include a total score for a first user 1120 at the media equipment 820 and for a second user 1130 at the same or different (remote) media equipment 820. Interactive execution circuit 822 may include in prompt 1110 information that informs the user(s) about how many more points or how many points 1140 are necessary to receive a reward (as discussed above). The users may use this information to determine how close or how far away the users are from receiving a reward for responding to the interactive content.

Figure 12:
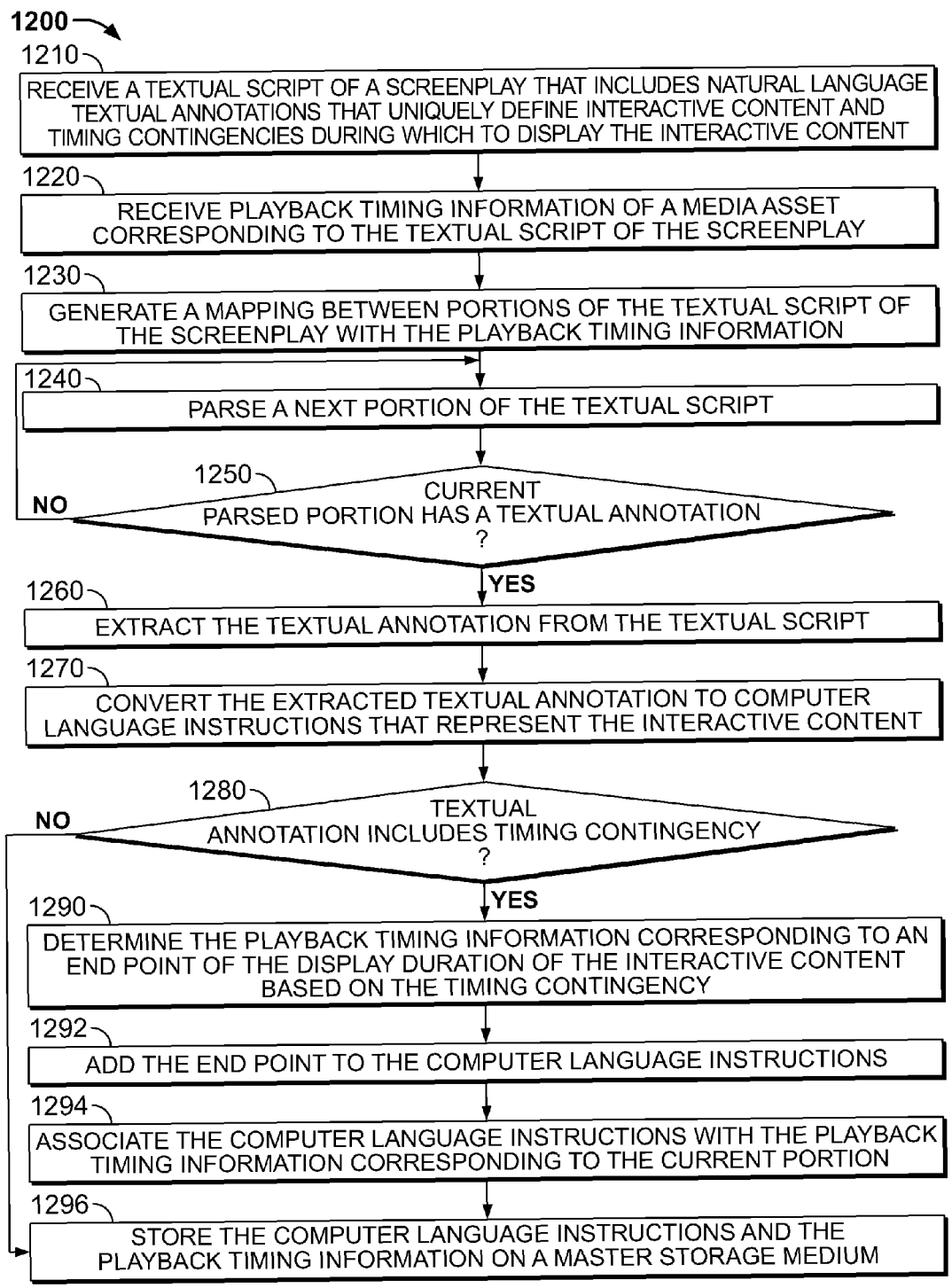
FIG. 12 is an illustrative flow diagram for embedding computer language instructions representing interactive content with a media asset on a master storage medium in accordance with embodiments of the present invention.

FIG. 12 is an illustrative flow diagram 1200 for embedding computer language instructions representing interactive content with a media asset on a master storage medium in accordance with embodiments of the present invention. At step 1210, a textual script of a screenplay is received that includes natural language textual annotations that uniquely define interactive content and timing contingencies during which to display the interactive content. For example, script 600 may be received by media asset production element 520 and media asset editing element 530 (FIGS. 5 and 6). Script 600 may include annotation 630 that defines interactive content 640/650 and timing contingency 660.

At step 1220, playback timing information of a media asset is received corresponding to the textual script of the screenplay. For example, post production editing element 532 may generate the final version of the media asset created by media asset production element 520 and provide the media asset and playback timing information corresponding to the final version of the media asset to annotation to computer language instructions converting unit 534 (FIG. 5).

At step 1230, a mapping between portions of the textual script of the screenplay with the playback timing information is generated. For example, annotation to computer language instructions converting unit 534 may identify action lines in script 600 and determine positions in playback of the media asset that correspond to the action lines. Annotation to computer language instructions converting unit 534 may generate interactive table of contents 700 that provides a mapping between the action lines in script 600 and the time during playback at which they occur (FIG. 7). In particular, interactive table of contents 700 may include time indicators 710 with corresponding event indicators 720 that identify substantially the exact time at playback of the media asset at which events occur or should occur (e.g., display of commercials or interactive content execution).

At step 1240, a next portion of the textual script is parsed. For example, annotation to computer language instructions converting unit 534 may parse each line of script 600 to identify and determine the event corresponding to that line in script 600.

At step 1250, a determination is made as to whether a current parsed portion has a textual annotation. For example, annotation to computer language instructions converting unit 534 may determine whether the parsed line in script 600 includes annotation 630. When the current parsed portion has a textual annotation, the process proceeds to step 1260, otherwise the process proceeds to step 1240.

At step 1260, the textual annotation is extracted from the textual script. For example, annotation to computer language instructions converting unit 534 may store a copy of the annotation in the currently parsed portion of script 600 in a memory.

At step 1270, the extracted textual annotation is converted to computer language instructions that represent the interactive content. For example, annotation to computer language instructions converting unit 534 may retrieve the stored extracted textual annotation and based on a predefined standard interpret the annotation to generate computer language instructions corresponding to the annotation. In some implementations, a human operator of annotation to computer language instructions converting unit 534 may read the annotation off a screen of annotation to computer language instructions converting unit 534. The human operator may interpret and write computer code corresponding to the annotation that may subsequently be compiled into the computer language instructions. In some implementations, annotation to computer language instructions converting unit 534 may automatically identify a predefined function (e.g., a function that implements a multiple choice interactive content question) that is associated with the annotation. Annotation to computer language instructions converting unit 534 may retrieve the identified function and pass as the parameters to the function values of the annotation (e.g., the content of the multiple choice question including the question and the answers).

At step 1280, a determination is made as to whether the textual annotation includes a timing contingency. For example, annotation to computer language instructions converting unit 534 may either automatically or by way of a human operator determine whether annotation 630 includes timing contingency 660. When the textual annotation includes a timing contingency, the process proceeds to step 1290, otherwise the process proceeds to step 1294.

At step 1290, the playback timing information corresponding to an end point of the display duration of the interactive content is determined based on the timing contingency. For example, annotation to computer language instructions converting unit 534 may playback the media asset until a portion (e.g., a line of dialog or a scene) is reached that matches or corresponds to the termination point defined by the timing contingency. In particular, the timing contingency may define the termination point of the execution of the computer language instructions to be at the beginning of scene five of the media asset. Annotation to computer language instructions converting unit 534 may identify scene five of the media asset and determine the corresponding playback timing information (e.g., a time code).

At step 1292, the end point is added to the computer language instructions. Annotation to computer language instructions converting unit 534 may insert an instruction to the computer language instructions indicating by when the computer language instructions are to terminate execution or stop accepting user responses.

At step 1294, the computer language instructions are associated with the playback timing information corresponding to the current portion. For example, annotation to computer language instructions converting unit 534 may add the computer language instructions or a reference to the computer language instructions in the event indicator 760 associated with timing indicator 712 corresponding to the current portion of the media asset being parsed.

At step 1296, the computer language instructions and the playback timing information are stored on a master storage medium on which the media asset is stored. For example, the output of media asset editing element 530 may include the finalized version of the media asset and the generated computer language instructions (including for example the interactive table of contents) and may be provided to media asset master storage medium 540.

Figure 13:
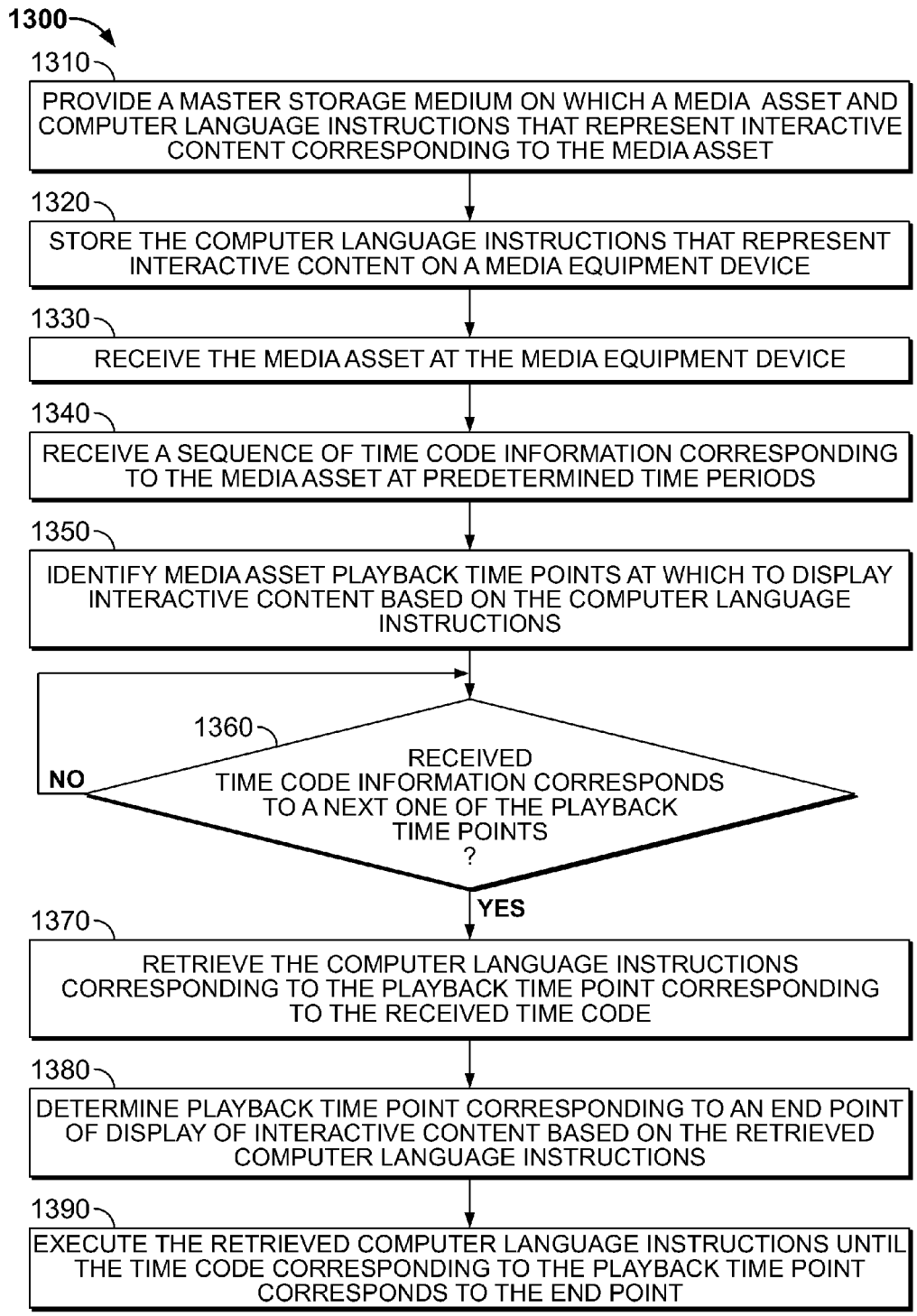
FIG. 13 is an illustrative flow diagram for displaying interactive content with a media asset in accordance with embodiments of the present invention.

FIG. 13 is an illustrative flow diagram 1300 for displaying interactive content with a media asset in accordance with embodiments of the present invention. At step 1310, a master storage medium on which a media asset and computer language instructions that represent interactive content corresponding to the media asset is provided. For example, media asset master storage medium 816 may be provided in media distribution facility 810 (FIG. 8). Media asset master storage medium 816 may include a copy of media asset master storage medium 840. Media asset master storage medium 816 may include the media asset video/audio information and computer language instructions that represent interactive content corresponding to the media asset. The interactive content may have subject matter similar to subject matter of the media asset.

At step 1320, the computer language instructions that represent the interactive content are stored on a media equipment device. For example, interactive content extraction circuit 812 may retrieve the computer language instructions (e.g., interactive table of contents) from media asset master storage medium 816. Communications device 811 may transmit the retrieved computer language instructions to media equipment 820 for storage in memory 826 (FIG. 8).

At step 1330, the media asset is received at the media equipment device. For example, processing element 818 may playback the media asset from media asset master storage medium 816 and transmit the media asset being played back through communications network 414 to media equipment 820 (FIG. 8).

At step 1340, a sequence of time code information is received corresponding to the media asset at predetermined time periods. In some implementations, timing generation circuitry 814 may reset a counter when processing element 818 starts playing back the media asset and may transmit the time code information based on the counter to media equipment 820 simultaneously while the media asset is played back and transmitted. The time code information may include the current playback time position of the media asset and media asset identification information including for example time, title, channel, source information, episode number, frame number, etc. In some implementations, the time code information may be embedded with the media asset on media asset master storage medium 816. In such circumstances, the time code information may be transmitted to media equipment 820 from media asset master storage medium 816 as the media asset is being played back and transmitted. In some implementations, the time code information may be maintained locally in media distribution facility 810 and not transmitted to media equipment 820. In such circumstances, media distribution facility 810 may execute computer language instructions representing interactive content at the time point in playback of the media asset specified in the interactive table of contents. In particular, interactive content execution circuit 822 and/or timing compare circuit 824 may be provided on media distribution facility 810 and in some implementations omitted from media equipment 820. The time codes may be transmitted at predetermined time intervals of one every second or one per frame or other suitable time interval.

At step 1350, media asset playback time points are identified at which to display interactive content based on the computer language instructions. For example, interactive content execution circuit 822 may process the received computer language instructions (e.g., the interactive table of contents) to identify time codes at which interactive content is to be displayed with the media asset. Interactive content execution circuit 822 may store time codes in timing compare circuit 824 corresponding to the playback time points in the media asset at which interactive content is to be displayed.

At step 1360, a determination is made as to whether the received time code information corresponds to a next one of the playback time points. For example, timing compare circuit 824 may monitor data stream (e.g., time codes in the VBI or received over communications network 414) corresponding to playback time positions of the media asset and may compare the received data stream time codes with the time codes corresponding to interactive content (e.g., event indicators identifying interactive content in the interactive table of contents). When the received time code information corresponds to the next playback time point, the process proceeds to step 1370, otherwise the process remains at step 1360. Timing compare circuit 824 may determine that the received time code information corresponds to the next playback time point when the playback time indicated by the received time code is greater than or equal to the stored playback time point.

At step 1370, the computer language instructions corresponding to the playback time point corresponding to the received time code are retrieved. For example, timing compare circuit 824 may transmit an interrupt to interactive content execution circuit 822 indicating the playback time code that corresponds to the received time code. Interactive content execution circuit 822 may identify the event indicator corresponding to the indicated playback time code and may retrieve either directly from the event indicator in the interactive table of contents or from a storage location identified by the event indicator the computer language instructions corresponding to the interactive content.

At step 1380, the playback time point corresponding to an end point of the display of the interactive content is determined based on the retrieved computer language instructions. For example, interactive content execution circuit 822 may determine based on the retrieved computer language instructions what the playback time code (e.g., the end point) is at which the computer language instructions should terminate or stop accepting responses from the user. The end point may be stored with timing compare circuit 824 for determining whether a received time code corresponds to the end point.

At step 1390, the retrieved computer language instructions are executed until the time code corresponds to the playback time point corresponding to the end point. For example, interactive content execution circuit 822 may execute the computer language instructions to display the interactive content on display 823 using, for example, a web browser to run the computer language instructions. Interactive content execution circuit 822 may stop accepting user responses received with input 825 or close the web browser or application running the computer language instructions when the received time code corresponds to the end point.

Figure 14:
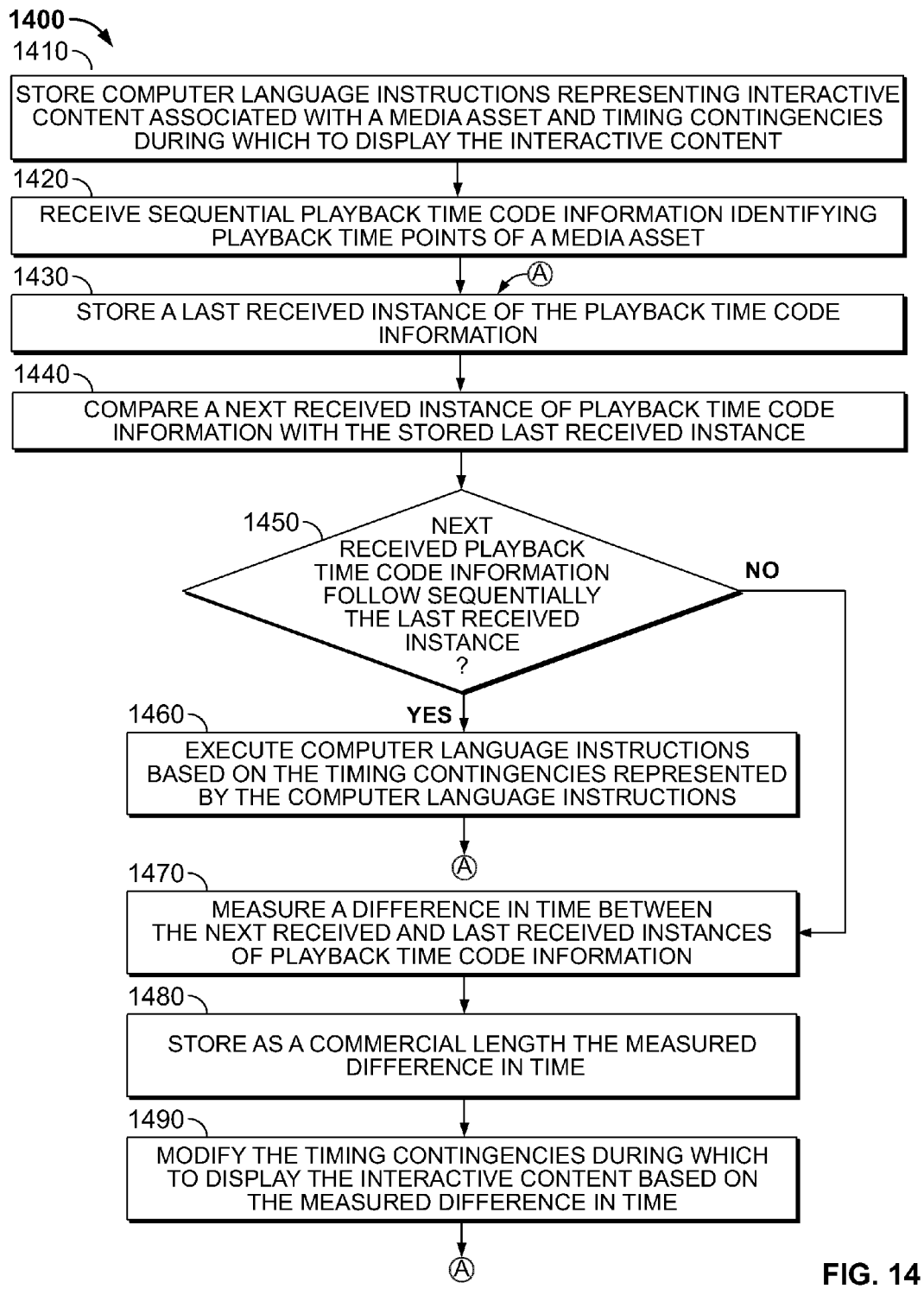
FIG. 14 is an illustrative flow diagram for displaying interactive content with a media asset based on dynamic commercial length determination in accordance with embodiments of the present invention.

FIG. 14 is an illustrative flow diagram 1400 for displaying interactive content with a media asset based on dynamic commercial length determination in accordance with embodiments of the present invention. At step 1410, computer language instructions are stored representing interactive content associated with a media asset and timing contingencies during which to display the interactive content. For example, interactive content extraction circuit 812 may retrieve the computer language instructions (e.g., interactive table of contents) from media asset master storage medium 816. Communications device 811 may transmit the retrieved computer language instructions to media equipment 820 for storage in memory 826 (FIG. 8).

At step 1420, sequential playback time code information is received identifying playback time points of a media asset. In some implementations, timing generation circuitry 814 may reset a counter when processing element 818 starts playing back the media asset and may transmit the time code information based on the counter to media equipment 820 simultaneously while the media asset is played back and transmitted. The time code information may include the current playback time position of the media asset and media asset identification information including for example time, title, channel, source information, episode number, frame number, etc. In some implementations, the time code information may be embedded with the media asset on media asset master storage medium 816. In such circumstances, the time code information may be transmitted to media equipment 820 from media asset master storage medium 816 as the media asset is being played back and transmitted. In some implementations, the time code information may be maintained locally in media distribution facility 810 and not transmitted to media equipment 820. In such circumstances, media distribution facility 810 may execute computer language instructions representing interactive content at the time point in playback of the media asset specified in the interactive table of contents. In particular, interactive content execution circuit 822 and/or timing compare circuit 824 may be provided on media distribution facility 810 and in some implementations omitted from media equipment 820 (FIG. 8).

At step 1430, a last received instance of the playback time code information is stored. For example, timing compare circuit 824 may store the last time code information media equipment 820 receives over communications network 414 (FIG. 8).

At step 1440, a next received instance of playback time code information is compared with the stored last received instance. For example, timing compare circuit 824 may compare a next one of the time code information in the sequence that is received over communications network 414 with the previously stored last received time code information.

At step 1450, a determination is made as to whether the next received playback time code information follows sequentially the last received instance. For example, timing compare circuit 824 may be configured with the interval (e.g., one second separation) between each of the playback time code information. Timing compare circuit 824 may accordingly determine whether the next received playback time code information corresponds to a time instance that is one instance greater than the time instance of the previously stored last received time code information. For example, the time code information may be received one every second and the previously stored last received time code information may correspond to the time instance of 8:23. Accordingly, the next received time code information that follows sequentially from the previously stored last received time code information should be 8:24 based on a one time code information per second transmission. When the next received playback time code information follows sequentially, the process proceeds to step 1460, otherwise the process proceeds to step 1470.

At step 1460, computer language instructions are executed based on the timing contingencies represented by the computer language instructions. For example, steps 1370, 1380 and 1390 may be processed using interactive content execution circuit 822 to execution computer language instructions corresponding to the event indicator associated with the received playback time code.

At step 1470, a difference in time is measured between the next received and the last received instances of playback time code information. For example, timing compare circuit 824 may subtract the next received instance of playback time code information with the previously stored last received instance of time code information to determine a difference in time. In particular, in some implementations, time codes may correspond to positions in time at which the content of the media asset is played back and exclude positions in time at which commercials are inserted when the media asset is played back. More specifically, the time code information may be transmitted while the content or subject matter of the media asset is transmitted and the time code information may be stopped or not be transmitted during the commercial breaks. However, during the commercial breaks, timing generation circuitry 814 may continue to count up the playback time. Accordingly, when the media asset content resumes playback the time code provided by the timing generation circuitry 814 to media equipment 820 corresponds to the total amount of time from when the content of the media asset was replaced by the commercial break and including the length of the commercial break. Thus, timing compare circuit 824 may determine the length of time between each of the received playback time codes to determine the length of the commercial.

For example, the last scene of the media asset may have ended at time code information 8:26 which may also be the last time code information transmitted to media equipment 820. The commercial break may last 4 minutes and accordingly, the next time code transmitted to media equipment 820 when the first scene of the media asset after the commercial break is started may be 8:30. Timing compare circuit 824 may subtract the last time code information (e.g., 8:26) from the next received time code information (e.g., 8:30) and determine that the commercial break length is 0:04 minutes long.

At step 1480, a commercial length is stored as the measured difference in time. For example, timing compare circuit 824 may store the computed difference in memory 826 as the commercial length.

At step 1490, the timing contingencies during which to display the interactive content are modified or adjusted based on the measured difference in time. For example, interactive content execution circuit 822 may retrieve the commercial length stored in memory 826 and compute the expected length of commercial breaks based on the time and event indicators in the table of contents. For example, interactive content execution circuit 822 may identify which event indicators identify commercials and may compute a difference in value between the time indicator corresponding to the beginning of the event indicator that identifies a commercial and the time indicator corresponding to the next event indicator after the event indicator that identifies a commercial break.

For example, interactive content execution circuit 822 may compute a difference between time indicator 6:51:22 corresponding to event indicator that identifies "Commercial Break A" and the time indicator corresponding to the event indicator that identifies "Beginning of Act 1" in interactive table of contents 700 (FIG. 7). Interactive content execution circuit 822 may compare the expected value for the commercial break length determined based on the interactive table of contents with the actual commercial length value determined by timing compare circuit 824.

When the values match, interactive content execution circuit 822 may not make adjustments to when interactive content is displayed. When there is a difference between the values, interactive content execution circuit 822 may determine whether the difference is greater or less than the expected commercial break length. When the actual commercial length is greater than the expected commercial length, interactive content execution circuit 822 may continue execution of the computer language instructions and may continue accepting user responses for a period of time, past the timing contingency defined by the computer language instructions, equal to or less than the difference between the actual and expected commercial length values. When the actual commercial length is less than the expected commercial length, interactive content execution circuit 822 may terminate execution of the computer language instructions and may disregard or not accept user responses at a point in time, before the timing contingency defined by the computer language instructions, equal to or less than the difference between the actual and expected commercial length values.

It should be understood, that the above steps of the flow diagrams of FIGS. 12-14 may be omitted entirely or executed or performed in any order or sequence not limited to the order and sequence shown and described in the figures. Also, some of the above steps of the flow diagrams of FIGS. 12-14 may be executed or performed substantially simultaneously where appropriate or in parallel to reduce latency and processing times.

The above described embodiments of the present invention are presented for purposes of illustration and not of limitation, and the present invention is limited only by the claims which follow.

What is claimed is:

1. A method for transmitting a media asset with interactive content, the method comprising:
receiving a textual script of a screenplay corresponding to the media asset, wherein the textual script includes natural language textual annotations that uniquely define the interactive content and timing contingencies during which to display the interactive content;
storing a media asset corresponding to the script on a master storage medium;
parsing the annotations to determine, based on the timing contingencies, a first time interval in the media asset during which to display the interactive content;
converting the annotations to computer language instructions that represent the interactive content and the first time interval;
adding the computer language instructions to the master storage medium on which the media asset is stored; and
providing the master storage medium to a distribution source for transmission of the media asset and the computer language instructions stored on the master storage medium to a media equipment device.

2. The method of claim 1, wherein the script of the screenplay further includes a first scene description and dialog corresponding to the media asset and a second scene description and dialog corresponding to the media asset, and wherein the timing contingencies refer, using the natural language, to the first scene to allow the display of the interactive content and refer, using the natural language, to the second scene to prevent the display of the interactive content.

3. The method of claim 1 further comprising:
generating a sequence of numeric time codes associated with the media asset that each represents a unique point of time in the media asset playback; and
transmitting with the media asset one of the numeric time codes at regular intervals.

4. The method of claim 3, wherein parsing the annotations comprises:
identifying a first of the time codes corresponding to the first scene description and a second of the time codes corresponding to the second scene description; and
associating the first time code with a start point of the first time interval and the second time code with an end point of the first time interval.

5. The method of claim 3 further comprising:
generating a table which includes a plurality of time indicators with a corresponding plurality of event indicators, wherein:
each of the time indicators corresponds to a different one of the numerical time codes at which an event associated with the corresponding one of the plurality of event indicators occurs, and a first of the time indicators identifies a start point of the first time interval and a corresponding first event indicator identifies the interactive content;

storing the table on the master storage medium on which the media asset is stored; and transmitting with the media asset the stored table at predetermined points in time during transmission of the media asset.

6. The method of claim 5 wherein the first event indicator includes at least one the computer language instructions and a link to the computer language instructions.

7. The method of claim 5 wherein the first event indicator includes a reference to a second of the time indicators corresponding to an end point of the first time interval.

8. The method of claim 5 further comprising:

comparing a received numeric time code with one of the time indicators in the table stored at the media equipment device;

when the received numeric time code is greater than or equal to the first time indicator, retrieving the computer language instructions identified by the corresponding first event indicator for displaying the interactive content; and when the received numeric time code is greater than or equal to a second of the plurality of time indicators identified by the computer language instructions as an end point of the first time interval, terminating the display of the interactive content.

9. The method of claim 8 further comprising:
storing the table at the media equipment device;
receiving the numeric time code at the media equipment device; and
wherein the received numeric time code is compared at the media equipment device.

10. The method of claim 1 further comprising processing the computer language instructions to generate on a display text or graphics corresponding to the interactive content that is uniquely defined by the natural language annotations.

11. The method of claim 1 further comprising:
receiving user input corresponding to the interactive content displayed during the first time interval;
determining whether the user input was received within the first time interval;
processing the user input when the determining determines the user input was received within the first time interval.

12. The method of claim 11 further comprising:
preventing the user input from being considered in scoring when the determining determines the user input was received outside the first time interval; and
displaying a prompt informing the user that the user input was received outside the first time interval.

13. The method of claim 11 wherein processing the user input comprises:
determining whether the user input is associated with a correct response to the interactive content;
adding points to a running score associated with the user when the user input is associated with the correct response;
displaying a prompt informing the user that the user input is associated with the correct response.

14. The method of claim 1 further comprising:
receiving the media asset and the computer language instructions at the media equipment device;
processing the computer language instructions with an application programmed to present interactive content at the media equipment device; and displaying with the application, the interactive content during the first time interval.

15. The method of claim 1 wherein the interactive content corresponds to at least one of a challenge question, a puzzle, a video game, and a memory game.

16. The method of claim 1 wherein the media asset and the computer language instructions stored on the master storage medium are transmitted over at least one of the Internet, cable transmission medium, satellite transmission medium, terrestrial transmission medium.

17. The method of claim 1 wherein subject matter of the interactive content is similar to subject matter of the media asset.

18. The method of claim 1 wherein the script is written before the media asset is stored.

19. A system for transmitting a media asset with interactive content, the system comprising:
a media equipment device; and
processing circuitry configured to
receive a textual script of a screenplay corresponding to the media asset, wherein the textual script includes natural language textual annotations that uniquely define the interactive content and timing contingencies during which to display the interactive content;
store a media asset corresponding to the script on a master storage medium;
parse the annotations to determine, based on the timing contingencies, a first time interval in the media asset during which to display the interactive content;
convert the annotations to computer language instructions that represent the interactive content and the first time interval;
add the computer language instructions to the master storage medium on which the media asset is stored; and
provide the master storage medium to a distribution source for transmission of the media asset and the computer language instructions stored on the master storage medium to the media equipment device.

20. The system of claim 19, wherein the script of the screenplay further includes a first scene description and dialog corresponding to the media asset and a second scene description and dialog corresponding to the media asset, and wherein the timing contingencies refer, using the natural language, to the first scene to allow the display of the interactive content and refer, using the natural language, to the second scene to prevent the display of the interactive content.

21. The system of claim 19 wherein the processing circuitry is further configured to:
generate a sequence of numeric time codes associated with the media asset that each represents a unique point of time in the media asset playback; and
transmit with the media asset one of the numeric time codes at regular intervals.

22. The system of claim 21, wherein the processing circuitry is further configured to:
identify a first of the time codes corresponding to the first scene description and a second of the time codes corresponding to the second scene description; and
associate the first time code with a start point of the first time interval and the second time code with an end point of the first time interval.

23. The system of claim 21 wherein the processing circuitry is further configured to:
generate a table which includes a plurality of time indicators with a corresponding plurality of event indicators, wherein:

each of the time indicators corresponds to a different one of the numerical time codes at which an event associated with the corresponding one of the plurality of event indicators occurs, and a first of the time indicators identifies a start point of the first time interval and a corresponding first event indicator identifies the interactive content;

store the table on the master storage medium on which the media asset is stored; and transmit with the media asset the stored table at predetermined points in time during transmission of the media asset.

24. The system of claim 23 wherein the first event indicator includes at least one the computer language instructions and a link to the computer language instructions.

25. The system of claim 23 wherein the first event indicator includes a reference to a second of the time indicators corresponding to an end point of the first time interval.

26. The system of claim 23 further comprising second processing circuitry at the media equipment device configured to:

compare a received numeric time code with one of the time indicators in the table stored at the media equipment device;

when the received numeric time code is greater than or equal to the first time indicator, retrieve the computer language instructions identified by the corresponding first event indicator for displaying the interactive content; and when the received numeric time code is greater than or equal to a second of the plurality of time indicators identified by the computer language instructions as an end point of the first time interval, terminat the display of the interactive content.

27. The system of claim 26 wherein the second processing circuitry is further configured to:

store the table at the media equipment device;

receive the numeric time code at the media equipment device; and wherein the received numeric time code is compared at the media equipment device.

28. The system of claim 19 wherein the processing circuitry is further configured to process the computer language instructions to generate on a display text or graphics corresponding to the interactive content that is uniquely defined by the natural language annotations.

29. The system of claim 19 further comprising second processing circuitry at the media equipment device configured to:

receive user input corresponding to the interactive content displayed during the first time interval;

determine whether the user input was received within the first time interval;

process the user input when the determining determines the user input was received within the first time interval.

30. The system of claim 29 wherein the second processing circuitry is further configured to:

prevent the user input from being considered in scoring when the determining determines the user input was received outside the first time interval; and display a prompt informing the user that the user input was received outside the first time interval.

31. The system of claim 29 wherein the second processing circuitry is further configured to:

determine whether the user input is associated with a correct response to the interactive content;

add points to a running score associated with the user when the user input is associated with the correct response;

display a prompt informing the user that the user input is associated with the correct response.

32. The system of claim 19 further comprising second processing circuitry at the media equipment device configured to:

receive the media asset and the computer language instructions at the media equipment device;

process the computer language instructions with an application programmed to present interactive content at the media equipment device; and display with the application, the interactive content during the first time interval.

33. The system of claim 19 wherein the interactive content corresponds to at least one of a challenge question, a puzzle, a video game, and a memory game.

34. The system of claim 19 wherein the media asset and the computer language instructions stored on the master storage medium are transmitted over at least one of the Internet, cable transmission medium, satellite transmission medium, terrestrial transmission medium.

35. The system of claim 19 wherein subject matter of the interactive content is similar to subject matter of the media asset.

36. The system of claim 19 wherein the script is written before the media asset is stored.

\* \* \* \* \*

UNITED STATES PATENT AND TRADEMARK OFFICE
CERTIFICATE OF CORRECTION

PATENT NO. : 8,131,132 B2
APPLICATION NO. : 12/631107
DATED : March 6, 2012
INVENTOR(S) : Walter R. Klappert It is certified that error appears in the above-identified patent and that said Letters Patent is hereby corrected as shown below:

At column 39, claim number 26, line number 34, replace "terminat" with --terminate--

Signed and Sealed this
Eighth Day of May, 2012

David J. Kappos
*Director of the United States Patent and Trademark Office*